US012700941B2

(12) United States Patent
Ito et al.

(10) Patent No.: US 12,700,941 B2
(45) Date of Patent: Aug. 4, 2026

(54) METHOD FOR WIRELESS COMMUNICATION BY REMOTELY CONTROLLING BEAMFORMING

(71) Applicant: NTT, Inc., Tokyo (JP)

(72) Inventors: Kota Ito, Tokyo (JP); Mizuki Suga, Tokyo (JP); Takuto Arai, Tokyo (JP); Yushi Shirato, Tokyo (JP); Daisei Uchida, Tokyo (JP); Naoki Kita, Tokyo (JP); Takeshi Onizawa, Tokyo (JP)

(73) Assignee: NTT, Inc., Tokyo (JP)

( * ) Notice: Subject to any disclaimer, the term of this patent is extended or adjusted under 35 U.S.C. 154(b) by 337 days.

(21) Appl. No.: 18/274,027

(22) PCT Filed: Jan. 27, 2021

(86) PCT No.: PCT/JP2021/002852
§ 371 (c)(1),
(2) Date: Jul. 25, 2023

(87) PCT Pub. No.: WO2022/162789
PCT Pub. Date: Aug. 4, 2022

(65) Prior Publication Data
US 2024/0405910 A1 Dec. 5, 2024

(51) Int. Cl.
*H04J 14/02* (2006.01)

(52) U.S. Cl.
CPC .......... *H04J 14/02* (2013.01); *H04J 14/0298* (2013.01)

(58) Field of Classification Search
CPC . H04B 10/2575; H04L 45/62; H04L 12/2803; H04L 12/2885; H04J 14/02; H04J 14/023; H04J 14/0239
See application file for complete search history.

(56) References Cited

U.S. PATENT DOCUMENTS 7,043,271 B1 * 5/2006 Seto ..................... H04B 7/0617
398/58
2004/0214603 A1 * 10/2004 Tanabe ............. H04B 10/25753
455/561

(Continued)

FOREIGN PATENT DOCUMENTS

JP 2001-086057 A 3/2001
JP 2013-146039 A 7/2013

(Continued)

OTHER PUBLICATIONS

"A novel centralized beamforming scheme for radio-over-fiber systems with fixed wavelength allocation"; Special Cluster in Conjunction with IEICE General Conference 2019 IEICE Communications Express, vol. 8, No. 12, 584-589; Ito et al. (Year: 2019).*

(Continued)

*Primary Examiner* — Benjamin H Elliott, IV
(74) *Attorney, Agent, or Firm* — Harness, Dickey & Pierce, 1PLC

(57) ABSTRACT

A wireless communication method wherein among a signal processing function and a communication function provided by a wireless communication device, a centralized unit having a signal processing function transmits an optical signal having a form corresponding to a downstream radio signal to be a transmission target in the communication function, to a communication target radio unit which communicates with an external communication device among two or more radio units having a communication function connected to the centralized unit via an optical fiber, and performs beam forming control of the communication target radio unit, and the communication target radio unit, according to control of the centralized unit, communicates with the external communication device.

5 Claims, 15 Drawing Sheets

(56) References Cited

U.S. PATENT DOCUMENTS

| | | | | |
|---|---|---|---|---|
| 2005/0074037 | A1* | 4/2005 | Rickard | H04J 14/0298 |
| | | | | 370/537 |
| 2006/0079290 | A1* | 4/2006 | Seto | H01Q 3/2605 |
| | | | | 455/562.1 |
| 2010/0142955 | A1* | 6/2010 | Yu | H04J 14/025 |
| | | | | 398/115 |
| 2010/0329680 | A1* | 12/2010 | Presi | H04J 14/025 |
| | | | | 398/79 |
| 2013/0142515 | A1* | 6/2013 | Chen | H04Q 11/0067 |
| | | | | 398/67 |
| 2015/0030334 | A1* | 1/2015 | Eiselt | H04B 10/2575 |
| | | | | 398/79 |
| 2016/0248534 | A1* | 8/2016 | Kuang | H04B 10/503 |
| 2019/0288777 | A1* | 9/2019 | Ishimura | H04J 14/023 |
| 2021/0359780 | A1* | 11/2021 | Guan | H04B 10/506 |
| 2022/0021456 | A1* | 1/2022 | Otsuki | H04B 10/272 |
| 2022/0069910 | A1* | 3/2022 | Shen | G02B 6/4215 |
| 2022/0140905 | A1* | 5/2022 | Suga | H04B 10/25754 |
| 2024/0405910 | A1* | 12/2024 | Ito | H04J 14/0298 |

FOREIGN PATENT DOCUMENTS

| | | |
|---|---|---|
| JP | 2020-150376 A | 9/2020 |
| WO | WO-03/034621 A1 | 4/2003 |
| WO | WO-2020/166379 A1 | 8/2020 |

OTHER PUBLICATIONS

Fiber length estimation method for beamforming at millimeter wave band RoFFWA system; IEICE Communications Express, vol. 8, No. 11, 428-433; May 2019; Suga et al.; (Year: 2019).*

"Development of Highly Flexible Broadband Networks Incorporating Wavelength Division Multiplexing and Sub-carrier Division Multiplexing in a Hybrid Radio/Fiber Distribution System"; Proceedings of 2003 5th International Conference on Transparent Optical Networks, 2003 (Year: 2003).*

"Experimental Evaluation of Remote Beamforming Scheme with Fixed Wavelength Allocation for Radio-over-Fiber Systems"; Ito et al.; 2020 European Conference on Optical Communications (ECOC) | 978-1-7281-7361-0/20/$31.00 © 2020 IEEE | DOI: 10.1109/ECOC48923.2020.9333423 (Year: 2020).*

"Remote Beamforming Scheme With Fixed Wavelength Allocation for Radio-Over-Fiber Systems ; Employing Single-Mode Fiber"; Journal of Lightwave Technology, vol. 40, No. 4, Feb. 15, 2022; Ito et al. (Year: 2022).*

"Space-division multiplexing for optical fiber communications"; Puttnam et al.; Optica vol. 8, Issue 9, pp. 1186-1203 (2021) •https://doi.org/10.1364/OPTICA.427631 (Year: 2021).*

Umesh et al., "Overview of O-RAN Fronthaul Specifications", NTT DOCOMO Technical Journal, vol. 27, No. 1, Apr. 2019.

NGMN (Next Generation Mobile Networks), NGMN Overview on 5G RAN Functional Decomposition, 2018.

* cited by examiner

- PRIOR ART -

METHOD FOR WIRELESS COMMUNICATION BY REMOTELY CONTROLLING BEAMFORMING

CROSS-REFERENCE TO RELATED APPLICATIONS

This application is a 371 National Stage of International Application No. PCT/JP2021/002852, filed on Jan. 27, 2021. The entire disclosure of the above application is incorporated herein by reference.

TECHNICAL FIELD

The present invention relates to a wireless communication method and a wireless communication device.

BACKGROUND ART

Toward the spread of the 5th generation mobile communication system (the following, referred as "5G") and the local 5G, base stations are being installed in a wireless communication service providing area. The base station used for 5G and local 5G includes a centralized unit (CU), a distributed unit (DU), and a radio unit (RU) (refer to NPL 1). In addition, a plurality of combinations is defined as combinations of the centralized unit, the distributed unit, and the radio unit (refer to NPL 2).

CITATION LIST

Non Patent Literature

[NPL 1] Anil Umesh, and three others, "O-RAN Front Haul Specification Outline," NTT DOCOMO Technical Journal Vol. 27, No. 1 (April 2019)
[NPL 2] NGMN (Next Generations Mobile Networks) Alliance, "NGMN Overview on 5G PAN Functional Decomposition,"2018.

SUMMARY OF INVENTION

Technical Problem

FIG. 16 is a diagram showing a configuration example of a conventional wireless communication system of 5G and local 5G. A wireless communication system includes a host device, a centralized unit, a distributed unit, and one or more radio units 200. Transmission using a digital RoF (Radio-over-Fiber) such as eCPRI is performed between the distributed unit and one or more radio units 200.

In FIG. 16, the radio unit 200-1 to 200-3, are existing radio units in provision area of a wireless communication service. Each of the radio units 200-1 to 200-3 executes radio communication with a wireless terminal (not shown) in the cover area 201-1 to 200-3 (cell).

In a conventional wireless communication system, since transmission using digital RoF is performed between a distributed unit and a radio unit 200, when converting a radio signal into an optical digital signal, a band of an optical signal larger than a band of the radio signal is required, and transmission efficiency is reduced. Further, the conventional radio unit 200 includes an O/E (Optical to Electrical) conversion unit, an E/O (Electrical to Optical) conversion unit, a signal processing unit, a D/A (Digital to Analog) conversion unit, an A/D (Analog to Digital) conversion, and an antenna element. Therefore, it is expensive and power consumption is large. For this reason, conventionally, at some time it is impossible to suppress an increase in the facility cost for expanding the provision area of the wireless communication service.

In view of the above circumstances, the present invention aims to provide a wireless communication method and a wireless communication device capable of performing efficient optical transmission while suppressing an increase in facility cost for expanding a provision area of a wireless communication service.

Solution to Problem

An embodiment of the present invention is a wireless communication method in which
    among a signal processing function and a communication function provided by a wireless communication device, a centralized unit having the signal processing function transmits an optical signal having a form corresponding to the downstream radio signal to be transmitted by the communication function, to a communication target radio unit which communicates with an external communication device, among two or more radio units having the communication function connected with the centralized unit via optical fiber,
    and performs beamforming control of the communication target radio unit;
    and the communication target radio unit communicates with the external communication device according to the control of the centralized unit.

An embodiment of the present invention is a wireless communication device includes
    among a signal processing function and a communication function provided by a wireless communication device, a centralized unit having the signal processing function and two or more radio units having the communication function connected with the centralized unit via optical fiber; and wherein,
    the centralized unit transmits an optical signal having a form corresponding to the downstream radio signal to be transmitted by the communication function, to a communication target radio unit which communicates with an external communication device, among two or more radio units having the communication function connected with the centralized unit via optical fiber,
    and performs beamforming control of the communication target radio unit;
    and the communication target radio unit communicates with the external communication device according to the control of the centralized unit.

Advantageous Effects of Invention

According to the present invention, efficient optical transmission can be performed while suppressing an increase in facility cost for expanding a provision area of a wireless communication service.

DESCRIPTION OF EMBODIMENTS

An embodiment of the present invention will be described in detail with reference to the diagrams.

(Overview)

Figure 1:
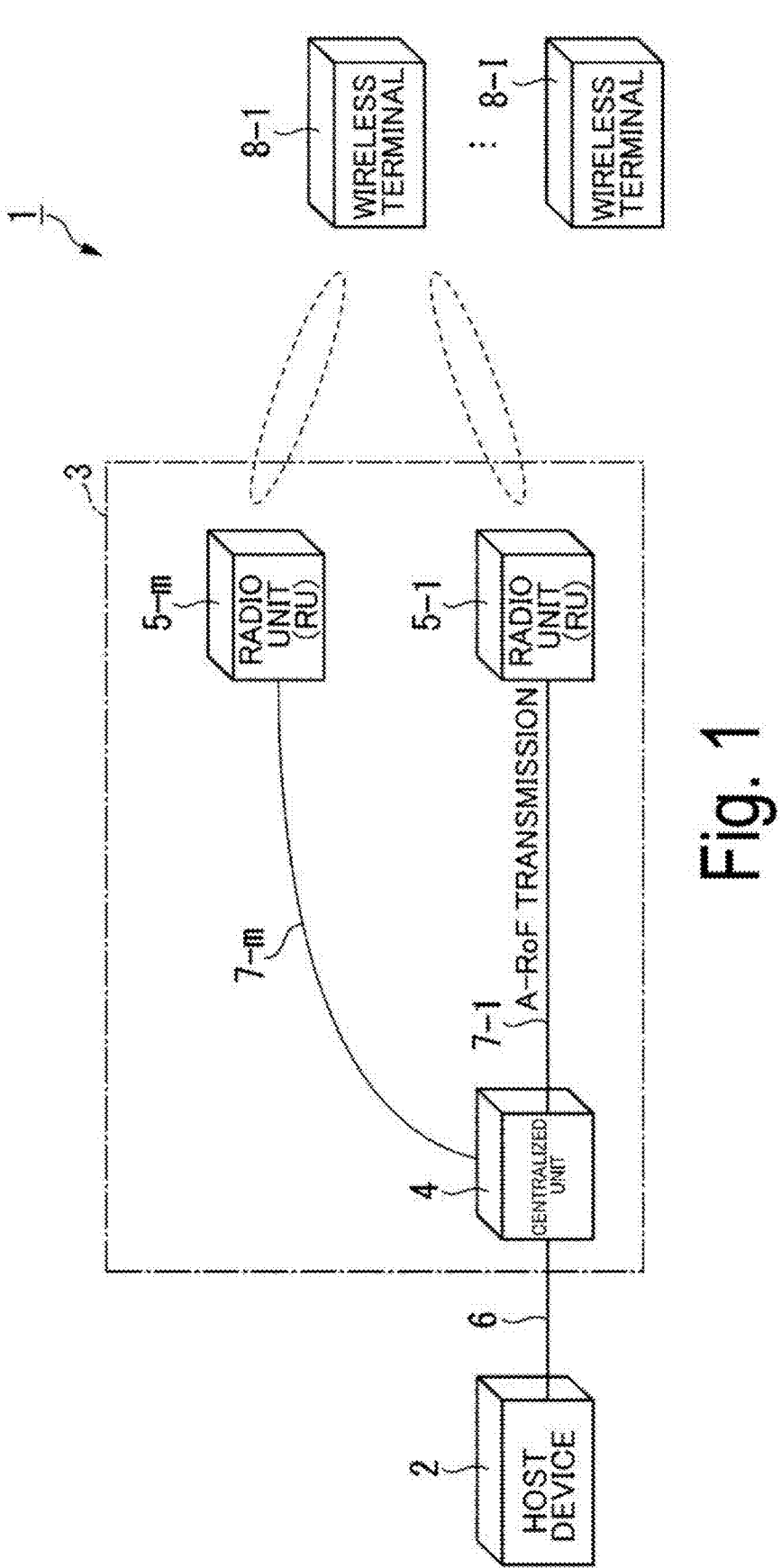
FIG. 1 is a diagram showing a configuration example of a wireless communication system according to each embodiment.

FIG. 1 is a diagram showing a configuration example of a wireless communication system 1 according to each embodiment. The wireless communication system 1 includes a host device 2 and a base station 3. The base station 3 includes a centralized unit 4 and a plurality of radio units 5-1 to 5-$m$. Here, m is an integer of 2 or more. Note that, in the following description, if it is not particularly distinguished, the radio unit 5-1 to 5-$m$ will be described as the radio unit 5. The radio units 5 are arranged in multiple planes in a provision area of wireless communication service. In the following description, the direction from the host device 2 to the base station 3 is defined as the downward direction, and the direction from the base station 3 to the host device 2 is defined as the upward direction.

The host device 2 and the centralized unit 4 are connected through a coaxial cable 6 (communication line). The centralized unit 4 and each radio unit 5-1 to 5-$m$ are connected through an optical fiber 7. The optical fiber 7 may be one or more single core fibers or a multi-core fiber having one or more cores. In FIG. 1, the centralized unit 4 and each radio unit 5-1 to 5-$m$ are connected by point-to-point (P-P) For example, the centralized unit 4 and the radio unit 5-1 are connected through an optical fiber 7-1, and the centralized unit 4 and the radio unit 5-$m$ are connected through an optical fiber 7-$m$.

The centralized unit 4 and each radio unit 5-1 to 5-$m$ may be connected by a passive optical network (PON). When the centralized unit 4 and each radio unit 5-1 to 5-$m$ are connected through a PON, an optical splitter (branching unit) is provided between the centralized unit 4 and each radio unit 5-1 to 5-$m$. The optical splitter branches the optical signal input from the centralized unit 4 and outputs the signal to each radio unit 5-1 to 5-$m$. The passive optical network is, for example, a WDM-PON (Wavelength Division Multiplexing-Passive Optical Network), or a TDM-PON (Time Division Multiplexing-Passive Optical. Network). In the following description, it is assumed that the centralized unit 4 and each radio unit 5-1 to 5-$m$ are connected by point-to-point.

The host device 2 outputs the downstream data to the centralized unit 4.

The centralized unit 4 generates downstream optical signals for each radio unit 5 by performing predetermined signal processing (for example, packetization and encoding) on the downstream data. For example, the centralized unit 4 generates a downstream optical signal destined to radio unit 5 that is a target for communication with one or more wireless terminals 8-$i$ (hereinafter, referred to as "communication target radio unit 5"). Note that i is an integer of 1 or more. I is an integer of 1 or more. Analog RoF transmission is used between the centralized unit 4 and each radio unit 5-1 to 5-$m$. In the analog RoF, an optical signal intensity-modulated according to a radio signal is transmitted through an optical fiber. The centralized unit 4 outputs the generated downstream signal to the radio unit 5. The centralized unit 4 has a signal processing function of separating a signal processing function and a communication function provided by the base station 3.

The radio unit 5 has a communication function, of which a signal processing function and a communication function provided by the base station 3 are separated. Therefore, the radio unit 5 includes at least a plurality of antenna elements and one or more optic/electric conversion units. The radio unit 5 may include an amplifier for amplifying signal intensity. In addition, the radio unit 5 perform wireless communication with wireless terminal 8-$i$. For example, the radio unit 5 forms a beam by being remotely controlled by the centralized unit 4 and performs wireless communication with a wireless terminal 8-$i$. Furthermore, a communication target radio unit 5 among the radio units 5 is selected by a centralized unit 4. For example, when communication is performed between the centralized unit 4 and the wireless terminal 8-$i$ via the radio unit 5, the radio unit 5 having the best communication quality is selected as the communication target radio unit 5.

A communication target radio unit 5 extracts a downstream radio signal from the optical signal by using optic electric (Optical-to-Electrical) conversion to the downstream optical signal subjected to analog RoF transmission through the optical fiber 7. One or more antenna elements included in the communication target radio unit 5 transmit a downstream radio signal to a wireless terminal 8-$i$. The wireless terminal 8-$i$ separates a stream corresponding to a downstream radio signal by signal processing such as MIMO (Multiple Input Multiple Output) signal processing.

The following four modes are assumed as the communication mode between the radio unit 5 and the wireless terminal 8-$i$.

(First Communication Mode)

A single radio unit 5 (for example, the radio unit 5-1), and a single wireless terminal 8-$i$ (for example, a wireless terminal 8-1) communicate with each other.

(Second Communication Mode)

A plurality of radio units 5-1 to 5-$m$ (for example, radio units 5-1 to 5-2) and a single wireless terminal 8-$i$ (for example, wireless terminal 8-1) communicate with each other.

(Third Communication Mode)

A single radio unit 5 (for example, the radio unit 5-1) and a plurality of wireless terminals **8-*i* (for example, the wireless terminals 8-1 to 8-2**) communicate with each other.

(Fourth Communication Mode)

A plurality of radio units 5-1 to **5-*m* (for example, the radio units 5-1 to 5-2) and a plurality of wireless terminals 8-*i* (for example, the wireless terminals 8-1 to 8-2**) communicate with each other.

In the following description, a plurality of operations will be described with reference to a plurality of embodiments on the assumption that the wireless communication system 1 performs communication in the first communication mode. The second and subsequent communication modes will be described with reference to the configuration described in the first communication mode.

First Embodiment

Figure 2:
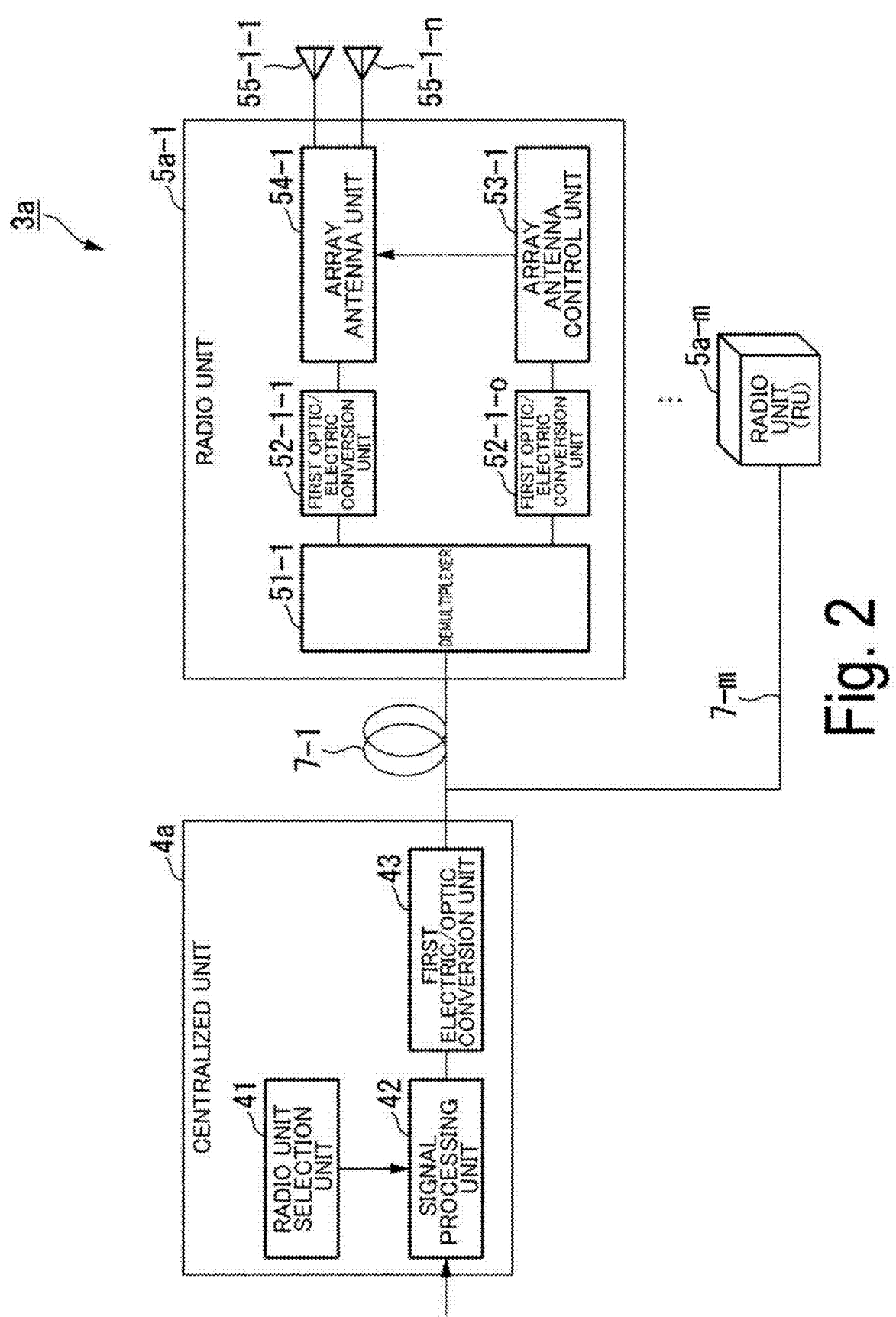
FIG. 2 is a diagram showing a configuration example of a base station according to a first embodiment.

FIG. 2 is a diagram showing a configuration of a base station **3*a* according to the first embodiment. The base station 3*a* is provided with a centralized unit 4*a* and a plurality of radio units 5*a*-1 to 5*a*-*m*. The centralized unit 4*a* corresponds to the centralized unit 4 shown in FIG. 1. The radio unit 5*a*-1 to 5*a*-*m* correspond to the radio unit 5-1 to 5-*m* in FIG. 1. Since the radio unit 5*a*-1 to 5*a*-*m* have the same configuration, the radio unit 5*a*-1** is explained as an example.

The centralized unit **4*a* includes a radio unit selection unit 41, a signal processing unit 42, and a first electric/optic conversion unit 43**.

The radio unit selection unit 41 selects a communication target radio unit 5. The radio unit selection unit 41 selects a communication target radio unit 5 by using a signal from a wireless terminal received via each radio unit 5. For example, the radio unit selection unit 41 may determine the radio unit 5 having the best communication quality by SNR (Signal to Noise Ratio) or the like without demodulating a signal from a wireless terminal received via each radio unit 5, or may determine the radio unit 5 having the best communication quality by BER (Bit Error Rate) or the like after demodulating.

The signal processing unit 42 performs signal processing on the downstream data (radio signal) output from the host device 2. The signal processing unit 42 in the first embodiment further performs signal processing on the control signal. The control signal in the first embodiment is a signal for performing control related to beam forming of the radio unit 5, and includes, for example, information indicating which of a plurality of antenna elements included in the radio unit 5 is used for communication, information related to a phase of the antenna element included in the radio unit 5, and the like. The signal processing unit 42 outputs the radio signal and the control signal after the signal processing to the first electric/optic conversion unit 43.

The first electric/optic conversion unit 43 converts the radio signal and the control signal output from the signal processing unit 42 into optical signals of different wavelengths. The first electric/optic conversion unit 43 outputs the converted optical signal by WDM.

The radio unit **5*a*-1 includes a demultiplexer 51-1, a plurality of first optic/electric conversion units 52-1-1 to 52-1-*o* (o is an integer of 1 or more), an array antenna control unit 53-1, and antenna unit 54-1**.

The demultiplexer 51-1 demultiplexes the optical signal input through the optical fiber 7-1. For example, the demultiplexer 51-1 demultiplexes the wavelength division multiplexed optical signal into a plurality of optical signals having different wavelengths. Second optic/electric conversion units 52-1-1 to **52-1-*o* are connected to a plurality of output ports of the demultiplexer 51-1. For example, the second optic/electric conversion unit 52-1 is connected to an output port for outputting an optical signal of a wavelength λ1 in the demultiplexer 51-1, and the second optic/electric conversion unit 52-*o*** is connected to an output port for outputting an optical signal, of a wavelength λo.

The second optic/electric conversion units 52-1-1 to **52-1-*o* convert optical signals input thorough the demultiplexer 51-1 into electrical signals. It should be noted that the number of the second optic/electric conversion unit 52-1-1 to 52-1-*o* may be one. When there is one second optic/electric conversion unit 52-1, the second optic/electric conversion unit 52-1 is provided in the front stage of the demultiplexer 51-1. The second optic/electric conversion units 52-1 converts an optical signal transmitted via the optical fiber 7-1** into an electrical signal.

The array antenna control unit 53-1 performs beam control of the array antenna unit 54-1 on the basis of the input control signal.

The array antenna unit 54-1 has a plurality of antenna elements 55-1-1 to **55-1-*n*. The antenna elements 55-1-1 to 55-1-*n* are provided on the array. The array antenna unit 54-1 emits an electric signal corresponding to the radio signal output from the second optic/electric conversion unit 52-1-1 via the antenna elements 55-1-1 to 55-1-*n* in accordance with the control of the array antenna control unit 53-1**.

An operation example of the base station **3*a*** will be described below.

Figure 3:
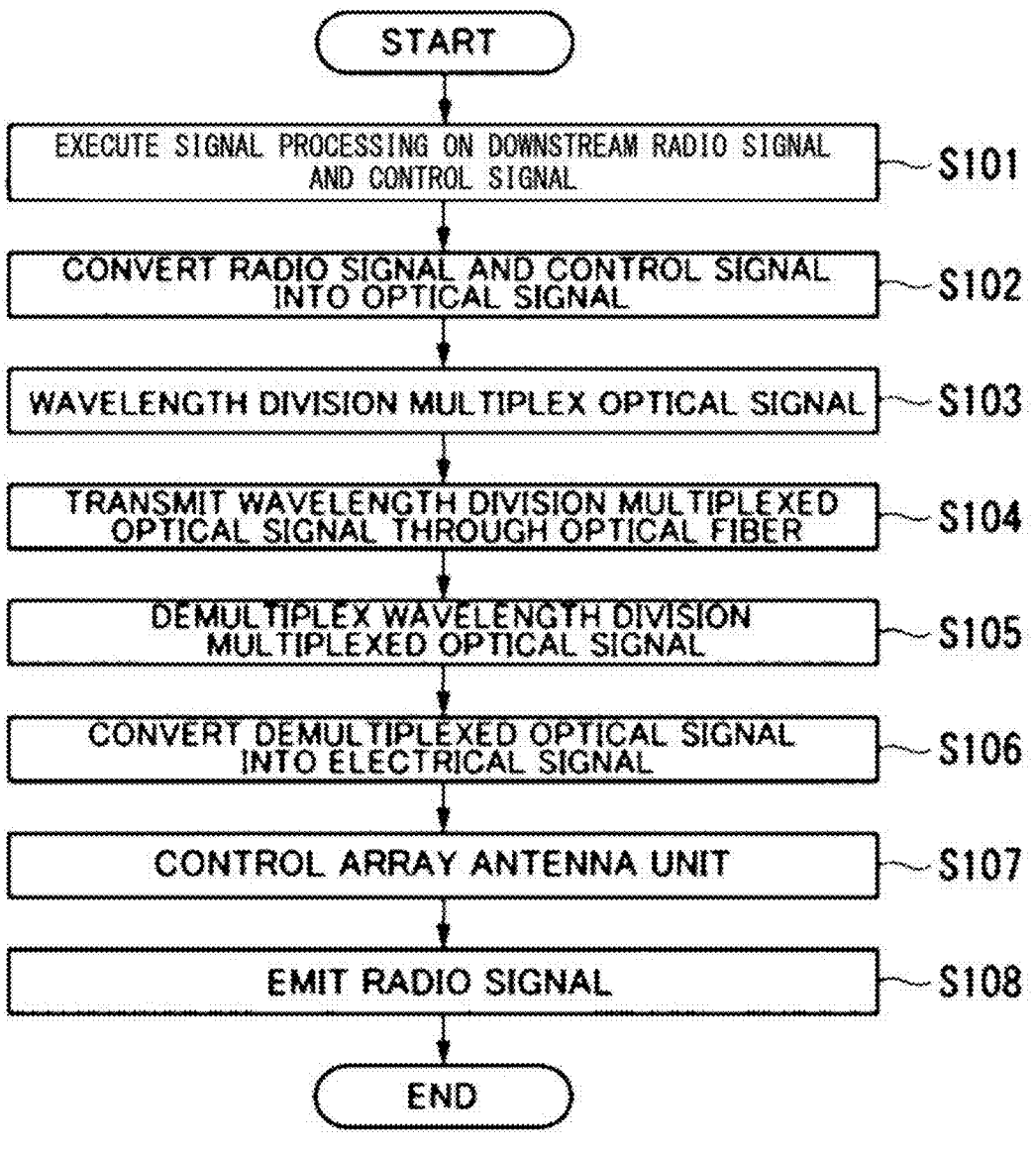
FIG. 3 is a diagram showing an operation example of a base station according to the first embodiment.

FIG. 3 is a diagram showing an operation of a base station **3*a* according to the first embodiment. In FIG. 3, it is assumed that the radio unit 5*a*-1 is the communication target radio unit 5*a***.

The signal processing unit 42 performs signal processing on the radio signal and the control signal (step S101). The signal processing unit 42 outputs the radio signal and the control signal after the signal processing to the first electric/optic conversion unit 43.

The first electric/optic conversion unit 43 converts the radio signal and the control signal output from the signal processing unit 42 into optical signals of different wavelengths, respectively (step S102). The first electric/optic conversion unit 43 performs wavelength division multiplexing of the converted optical signal (step S103). The first electric/optic conversion unit 43 transmits the wavelength division multiplexed optical signal to a communication target radio unit **5*a* (radio unit 5*a*-1) via an optical fiber 7. For example, the first electric/optic conversion unit 43 transmits the wavelength division multiplexed optical signal through an optical fiber 7-1 (step S104). The wavelength division multiplexed optical signal is transmitted to a radio unit 5*a*-1 via the optical fiber 7-1**.

The radio unit **5*a*-1 receives the optical signal transmitted through the optical fiber 7-1. The demultiplexer 51-1 demultiplexes the received optical signal (step S105). As a result, the optical signal of the wavelength λ1 is input to the first optic/electric conversion unit 52-1-1, and the optical signal of the wavelength λo is input to the first optic/electric conversion unit 52-1-*o***.

The first optic/electric conversion unit 52-1-1 converts the input optical signal of the wavelength λ1 into an electric signal (step S106). The electric signal is an electric signal corresponding to a radio signal. The first optic/electric conversion unit 52-1-1 outputs the electric signal to the array antenna unit 54-1.

The second optic/electric conversion unit **52-1-*o* converts the input optical signal of the wavelength λo into an electric signal (step S106). The electric signal is an electric signal corresponding to a control signal. The first optic/electric conversion unit 52-1-*o* outputs the electric signal to the array antenna control unit 53-1**.

The array antenna control unit 53-1 performs beam control of the array antenna unit 54-1 on the basis of the input electric signal (step S107). The array antenna control unit 53-1 controls a plurality of antenna elements 55-1-1 to **55-1-*n* provided by the array antenna unit 54-1 to emit radio signals in response to electrical signals input to the array antenna unit 54-1. The array antenna unit 54-1 radiates a radio signal corresponding to the input electric signal in accordance with the control of the array antenna control unit 53-1 (step S108**). In this way, the optical signal is transmitted using the analog RoF.

According to the base station **3*a* configured as described above, in a configuration in which the function of the base station 3*a* is divided into the centralized unit 4*a* and the radio unit 5*a*, a plurality of radio units 5*a* are connected to the centralized unit 4*a*, and the centralized unit 4*a* remotely controls beam forming of one or more radio units 5*a*. Thus, each radio unit 5*a* can only form a beam according to an instruction from the centralized unit 4*a*. Further, the base station 3*a* in the first embodiment performs analog RoF transmission between the centralized unit 4*a* and the radio unit 5*a*. Thus, it is not necessary to provide a digital-to-analog conversion unit for processing a digital signal in the radio unit 5*a*** and an analog-to-digital conversion unit, and an increase in the band of the optical signal can be suppressed, so that efficient optical transmission can be performed.

Thus, efficient optical transmission can be performed while suppressing an increase in facility cost for expanding a provision area of the wireless communication service.

A conventional radio unit (RU) includes a digital-to-analog conversion unit and an analog-to-digital conversion unit. Conventionally, when a wireless communication service providing area is expanded, a large number of radio units must be installed in the wireless communication service providing area in accordance with frequency characteristics such as linearity and attenuation of millimeter waves. In addition, in a wireless communication service providing area, it is sometimes difficult to install a radio unit at a high place such as a wall surface, a traffic light, a street lamp, or the like. Furthermore, the power consumption of the radio unit may be high. For these reasons, there are problems such as an increase in cost of equipment investment.

On the other hand, in the first embodiment, since the radio unit **5*a* does not include the digital-to-analog conversion unit and the analog-to-digital conversion unit, it is possible to suppress an increase in the cost of the facility investment compared with the conventional radio unit. Furthermore, since the radio unit 5*a* does not include a digital-to-analog conversion unit and an analog-to-digital conversion unit, it is smaller and lighter than a conventional radio unit. Therefore, the radio unit 5*a* can be easily installed even in a place (where installation load is large) such as a high place, a wall surface, a traffic light and a street lamp. That is, the radio unit 5*a*** can improve flexibility of an installation place.

Second Embodiment

In the second embodiment, the difference from the first embodiment is that the centralized unit performs subcarrier multiplexing (SCM). In the second embodiment, differences with the first embodiment will be mainly described. In the second embodiment, the centralized unit multiplexes electric signals of different frequency components to one optical wavelength by subcarrier multiplexing and transmits the multiplexed electric signals to the radio unit.

Figure 4:
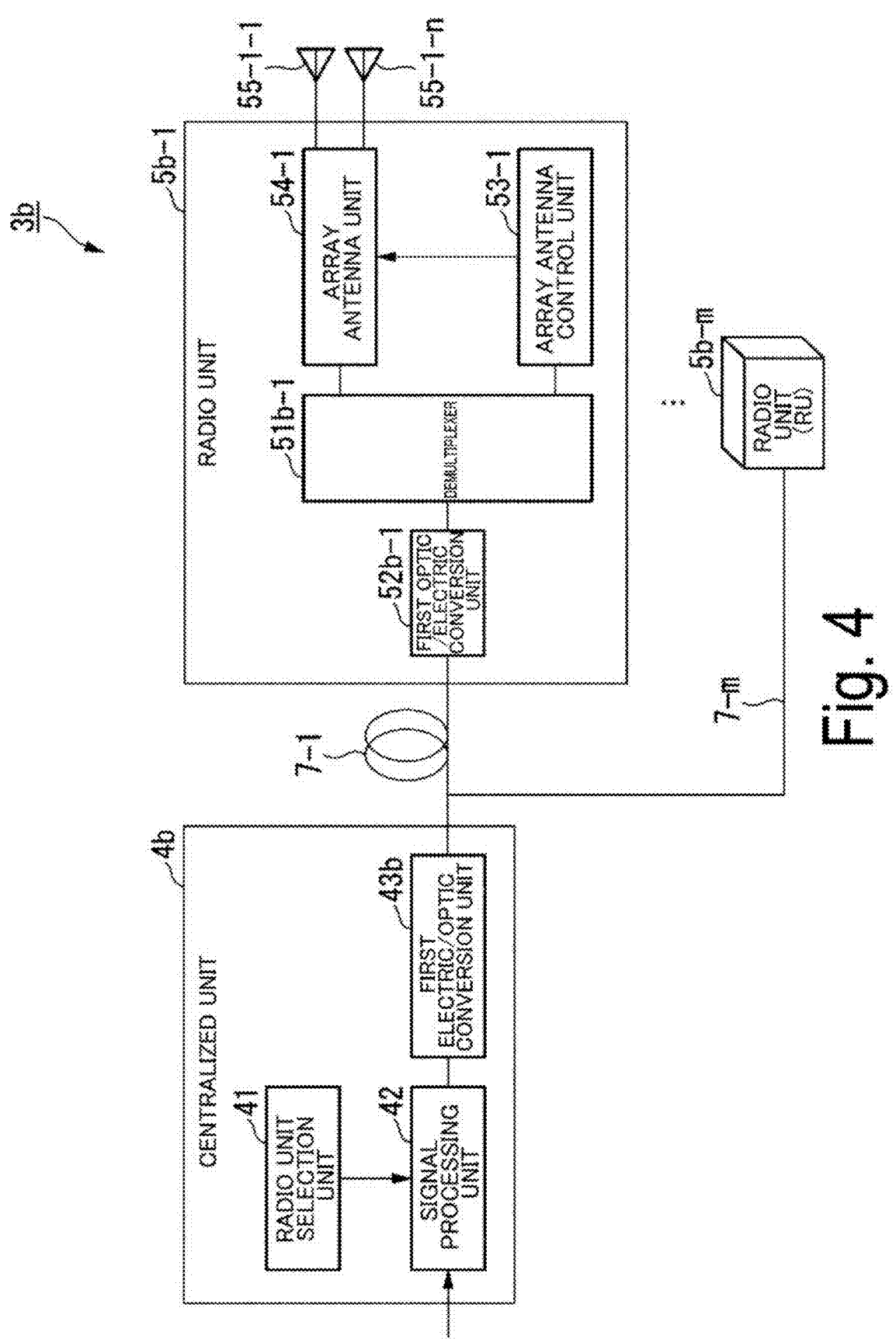
FIG. 4 is a diagram showing a configuration example of a base station according to a second embodiment.

FIG. 4 is a diagram showing a configuration of a base station **3*b* according to the second embodiment. The base station 3*b* is provided with a centralized unit 4*b* and a plurality of radio units 5*b*-1 to 5*b*-*m*. The centralized unit 4*b* corresponds to the centralized unit 4 shown in FIG. 1. The radio units 5*b*-1 to 5*b*-*m* correspond to the radio units 5-1 to 5-*m* in FIG. 1. Since the radio units 5*b*-1 to 5*b*-*m* have the same configuration, the radio unit 5*b*-1** will be described as an example.

The centralized unit **4*b* includes a radio unit selection unit 41, a signal processing unit 42, and a first electric/optic conversion unit 43*b***.

The first electric/optic conversion unit **43*b* subcarrier-multiplexes the radio signal and the control signal output from the signal processing unit 42 with the same wavelength and converts them into an optical signal. It is assumed that the radio signal and the control signal inputted to the first electric/optic conversion unit 43*b*** have different frequency components in an electric domain. For example, it is assumed that the frequency of the radio signal is defined as f1, and the frequency of the control signal is defined as f2. It is assumed that f1 is not equal to f2, and the radio signal and the control signal do not overlap in the frequency region.

The radio unit **5*b*-1 is provided with a demultiplexer 51*b*-1, a first optic/electric conversion unit 52*b*-1, an array antenna control unit 53-1, and an array antenna unit 54-1. The radio unit 5*b*-1 is different in configuration from the radio unit 5*a*-1 in the first embodiment in that the radio unit 5*b*-1 includes one first optic/electric conversion unit 52*b*-1, and the first optic/electric conversion unit 52*b*-1 is provided on the front stage (optical fiber 7-1 side) of the demultiplexer 51*b*-1**.

A demultiplexer **51*b*-1 demultiplexes the input electric signal. An electric signal outputted from the first optic/electric conversion unit 52*b*-1 (for example, an electric signal subjected to subcarrier multiplexing) is input to the demultiplexer 51*b*-1. In the second embodiment, an array antenna control unit 53-1 and an array antenna unit 54-1 are connected to a plurality of output ports of the demultiplexer 51*b*-1. For example, the demultiplexer 51*b*-1 outputs an electric signal of a frequency f1 from an output port to which the array antenna unit 54-1 is connected, and outputs an electric signal of a frequency f2 from an output port to which the array antenna control unit 53-1 is connected. In this way, the demultiplexer 51*b*-1** separates the radio signal from the control signal by demultiplexing the input electric signal at the electric stage.

An operation example of the base station **3*b* will be described below. Here, it is assumed that the radio unit 5*b*-1 is a communication target radio unit 5*b***.

The first electric/optic conversion unit **43*b* subcarrier-multiplexes the radio signal of the frequency f1 and the control signal of the frequency f2 outputted from the signal processing unit 42** at the same wavelength and converts them into an optical signal. Thus, the spectrum of the optical domain after the subcarrier multiplexing is expressed as follows when the subcarrier multiplexing is performed on the optical wavelength fc.

fc−f2: A lower sideband component of an array antenna main signal fc−f1: A lower side band component of an array antenna control signal fc: Optical carrier fc+f1: An upper side band component of an array antenna control signal fc+f2: An upper side band component of an array antenna main signal The first electric/optic conversion unit 43b transmits the optical signal after subcarrier multiplexing to the communication target radio unit 5b (radio unit 5b-1) via an optical fiber 7. For example, the first electric/optic conversion unit 43b transmits the optical signal after subcarrier multiplexing through an optical fiber 7-1. The optical signal after subcarrier multiplexing is transmitted to the radio unit 5b-1 via the optical fiber 7-1.

The radio unit 5b-1 receives a signal transmitted via the optical fiber 7-1. The first optic/electric conversion unit 52b-1 converts a received optical signal into an electrical signal. The first optic/electric conversion unit 52b-1 outputs the electric signal to the demultiplexer 51b-1. The demultiplexer 51b-1 demultiplexes the electric signal output from the second optic/electric conversion unit 52b-1. As described above, since the radio signal and the control signal do not overlap each other in the frequency domain, the radio signal and the control signal can be demultiplexed.

The electric signal demultiplexed by the demultiplexer 51b-1 is input to the array antenna control unit 53-1 and the array antenna unit 54-1. The array antenna control unit 53-1 performs the beam control of the array antenna unit 54-1 on the basis of the input electric signal.

The array antenna control unit 53-1 controls a plurality of antenna elements 55-1-1 to 55-1-n provided in the array antenna unit 54-1, and emits radio signals corresponding to electrical signals input to the array antenna unit 54-1. The array antenna unit 54-1 radiates a radio signal corresponding to the input electric signal in accordance with the control of the array antenna control unit 53-1. In this way, the optical signal is transmitted using the analog RoF.

By the base station 3b that has the foregoing configuration, it is possible to obtain similar advantages to the advantages of the first embodiment.

Further, in the base station 3b, the number of second optic/electric conversion units 52b provided in the radio unit 5b is smaller than that of the radio unit 5a in the first embodiment. Accordingly, the fabricating cost of the radio unit 5b also can be reduced.

Third Embodiment

In the third embodiment, the difference from the first embodiment is that the phase adjustment of the optical signal is performed in the centralized unit. In the third embodiment the differences from the first embodiment will be described mainly.

Figure 5:
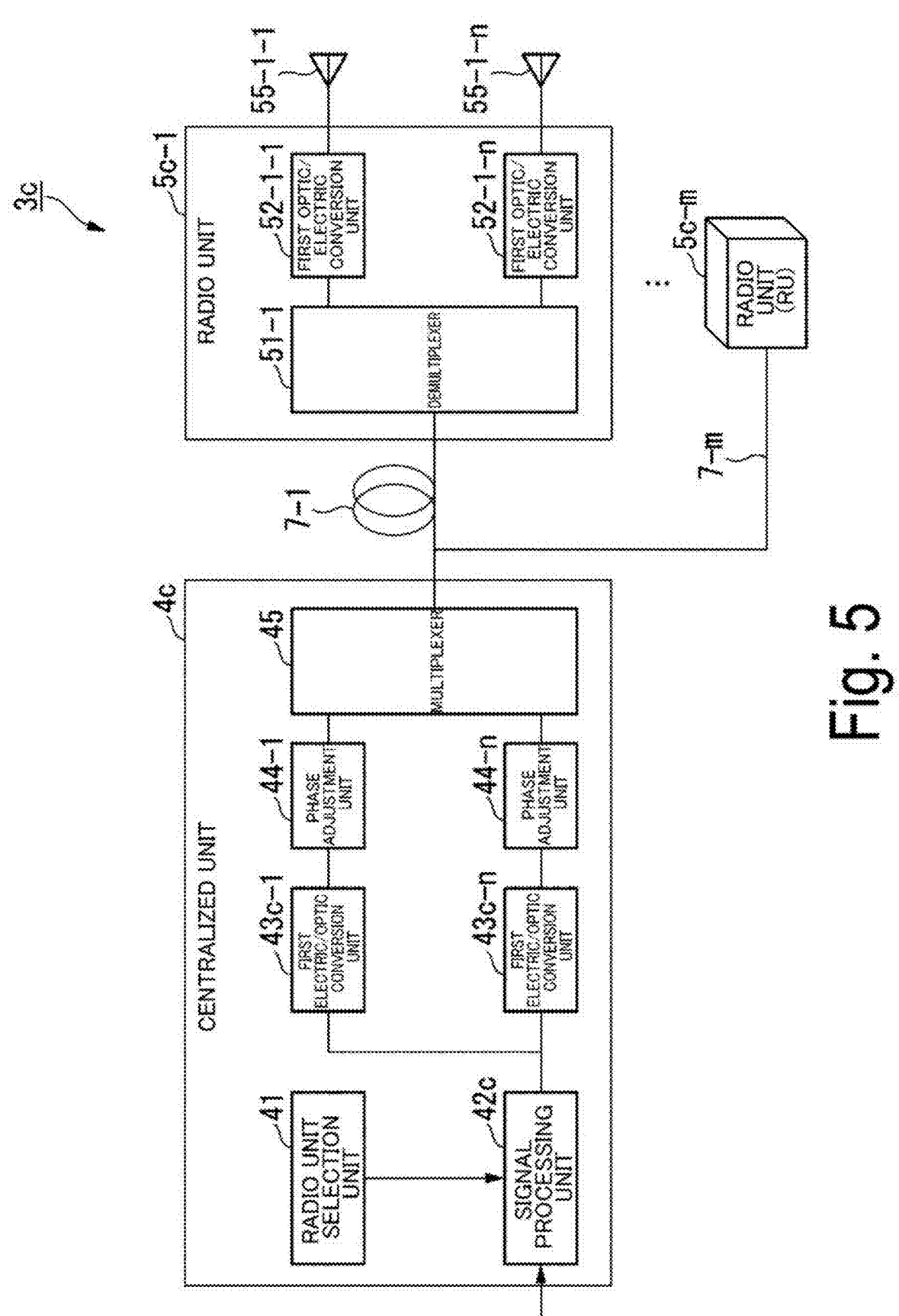
FIG. 5 is a diagram showing a configuration example of a base station according to a third embodiment.

FIG. 5 is a diagram showing a configuration of a base station 3c according to the third embodiment. The base station 3c is provided with a centralized unit 4c and a plurality of radio units 5c-1 to 5c-m. The centralized unit 4c corresponds to the centralized unit 4 shown in FIG. 1. The radio units 5c-1 to 5c-m corresponds to the radio units 5-1 to 5-m shown in FIG. 1. Since the radio units 5c-1 to 5c-m have the same configuration, the radio unit 5c-1 will be described as an example.

The centralized unit 4c includes a radio unit selection unit 41, a signal processing unit 42c, a plurality of first electric/optic conversion units 43c-1 to 43c-n, a plurality of phase adjustment units 44-1 to 44-n, and a multiplexer 45. The signal processing unit 42c performs signal processing to the downstream data output from the host device 2. The signal processing unit 42c outputs the radio signal to the first electric/optic conversion units 43c-1 to 43c-n.

The first electric/optic conversion units 43c-1 to 43c-n converts a radio signal output from the signal processing unit 42 into n optical signals of different wavelength. For example, the first electric/optic conversion units 43c-1 converts the radio signal into an optical signal having a wavelength $\lambda 1$. For example, the first optic/electric conversion unit 43c-n converts the radio signal into an optical signal of a wavelength $\lambda n$.

The phase adjustment units 44-1 to 44-n adjust the phase of the optical signal converted by the first optic/electric conversion unit 43c-3 to 43c-n. More specifically, the phase adjustment units 44-1 to 44-n adjust the phase so as to match the phase of the optical signal input to the phase adjustment units 44-1 to 44-n. As a method of adjusting the phase of the optical domain, a method of adjusting the optical path length by using an optical delay device or the like, or a method of adjusting the phase by adjusting the refractive index by using a dispersion control device or the like may be used. The phase adjustment may be performed by an analog signal or a digital signal.

A multiplexer 45 multiplexes the optical signals phase-adjusted by the phase adjustment units 44-1 to 44-n. Thus, the multiplexer 45 generates a wavelength division multiplexed optical signal. The multiplexer 45 outputs the wavelength-multiplexed optical signal.

The radio unit 5c-1 has a demultiplexer 51-1, a plurality of first optic/electric conversion units 52-1-1 to 52-1-n, and a plurality of antenna elements 55-1-1 to 55-1-n. One of antenna elements 55-1-1 to 55-1-n is connected to each of the first optic/electric conversion units 52-1-1 to 52-1-n. For example, the antenna element 55-1-1 is connected to the first optic/electric conversion unit 52-1-1.

An operation example of the base station 3c will be described below.

Figure 6:
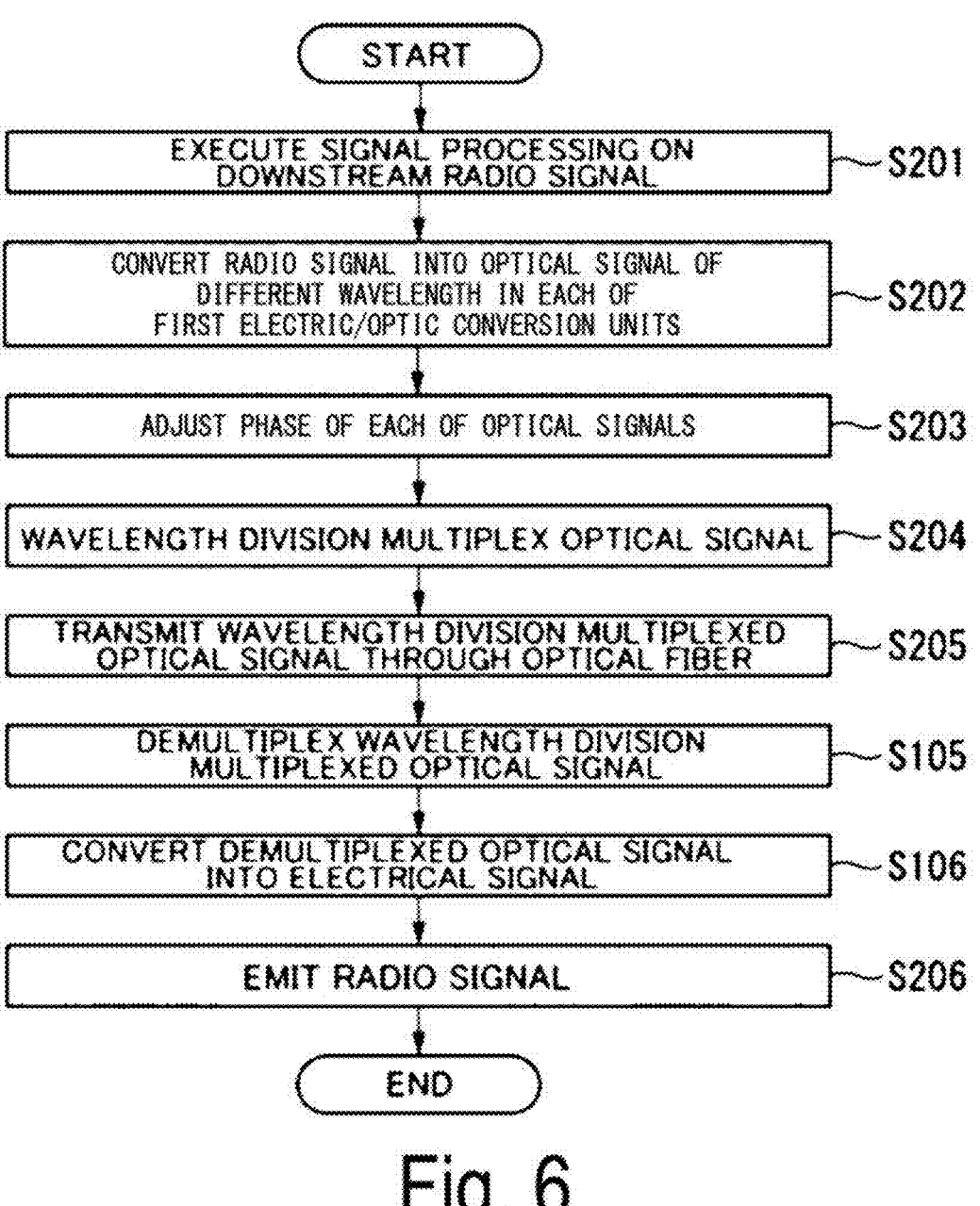
FIG. 6 is a diagram showing an operation example of a base station according to the third embodiment.

FIG. 6 is a diagram showing an operation example of the base station 3c according to the third embodiment. In FIG. 6, it is assumed that the radio unit 5c-1 is a communication target radio unit 5c.

The signal processing unit 42c performs signal processing to the radio signal (step S201). The signal processing unit 42c outputs the radio signal after the signal processing to the first electric/optic conversion units 43c-1 to 43c-n. The radio signal output from the signal processing unit 42c is demultiplexed into n pieces and input to the first electric/optic conversion units 43c-1 to 43c-n. The demultiplexing of the radio signal may be performed, for example, by using a demultiplexer of one input and multiple output, or by physically connecting a plurality of lines to the output side of the signal processing unit 42c. The first electric/optic conversion units 43c-1 to 43c-n converts the radio signal output from the signal processing unit 42c into n optical signals of different wavelengths (step S202). The first electric/optic conversion units 43c-1 to 43c-n output optical signals after conversion to the phase adjustment units 44-1 to 44-n.

The phase adjustment units 44-1 to 44-n adjust the phase of the input optical signal (step S203). The phase adjustment units 44-1 to 44-n output the optical signal after the phase adjustment to the multiplexer 45. The multiplexer 45 performs wavelength division multiplexing of the optical signal whose phase is adjusted by the phase adjustment units 44-1 to 44-n (step S204). The multiplexer 45 transmits the wavelength division multiplexed optical signal to a communication target radio unit 5c (radio unit 5c-1) via an optical fiber 7. For example, the multiplexer 45 transmits the wavelength-division multiplexed optical signal through the optical fiber 7-1 (step S205). The wavelength division multiplexed optical signal is transmitted to a radio unit 5c-1 via an optical fiber 7-1.

Thereafter, in the processing of steps S105 and S106, the optical signal transmitted through the optical fiber 7-1 is demultiplexed by a demultiplexer 51-1, and the demultiplexed optical signal is converted into an electric signal by the first optic/electric conversion units 52-1-1 to 52-1-n. The electric signal converted by the first optic/electric conversion units 52-1-3 to 52-1-n are input to the antenna elements 55-1-1 to 55-1-n. The antenna elements 55-1-1 to 55-1-n radiate the radio signal corresponding to the electrical signal (step S204). In this way, the optical signal is transmitted using the analog RoF.

By the base station 3c that has the foregoing configuration, it is possible to obtain similar advantages to the advantages of the first embodiment.

Further, in the base station 3c, the second optic/electric conversion units 52-1-1 to 52-1-n are connected to the output side of demultiplexer 51-1, and the antenna elements 55-1-1 to 55-1-n are connected to the output side of the second optic/electric conversion units 52-1-1 to 52-1-n. Thus, the beam formed by the radio unit 5c can be controlled by phase adjustment in the centralized unit 4d.

Variant Example of Third Embodiment

Figure 7:
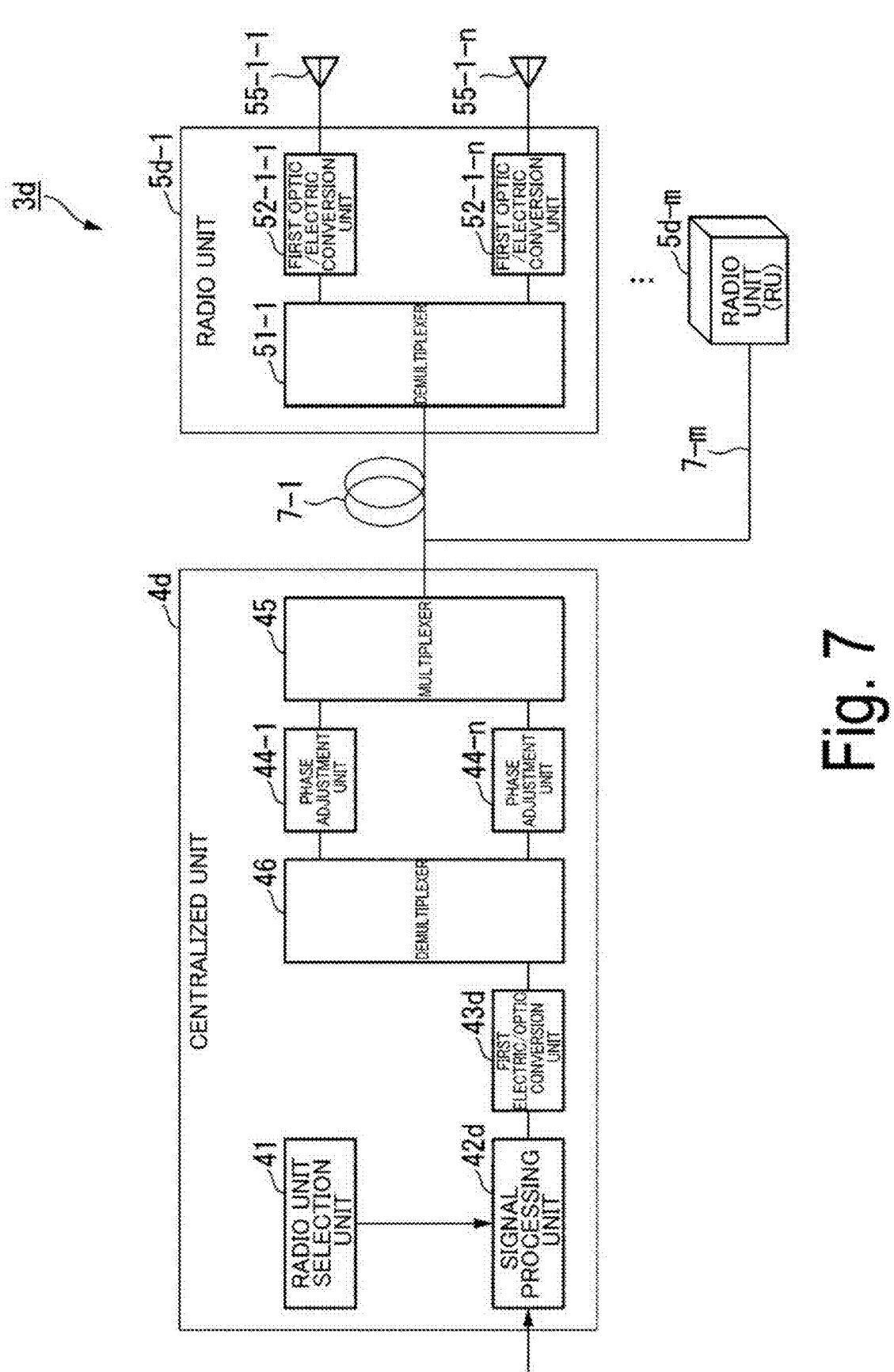
FIG. 7 is a diagram showing an arranged example of configuration of a base station according to a third embodiment.

In the above configuration, the centralized unit 4c is provided with n first electric/optic conversion units 43c-1 to 43c-n, but the centralized unit 4c may be provided with one first electric/optic conversion unit 43c-1. FIG. 7 is a diagram showing a configuration of a base station 3d according to the variant example of the third embodiment. The base station 3d is provided with a centralized unit 4d and a plurality of radio units 5d-1 to 5d-m. The centralized unit 4d corresponds to the centralized unit 4 shown in FIG. 1. The radio units 5d-1 to 5d-m corresponds to the radio units 5-1 to 5-m shown in FIG. 1. Since the function unit provided in the radio units 54-1 to 5d-m has the same configuration as the radio units 5c-1 to 5d-m in FIG. 5, description thereof will be omitted.

The centralized unit 4d includes a radio unit selection unit 41, a signal processing unit 42d, a first electric/optic conversion unit 43d, a plurality of phase adjustment units 44-1 to 44-n, a multiplexer 45 and a demultiplexer 46. The centralized unit 4d is provided with one first electric/optic conversion unit 43d, and the demultiplexer 46 is provided between the first electric/optic conversion unit 43d and the plurality of phase adjustment units 44-1 to 44-n.

The first electric/optic conversion unit 43d converts the radio signal output from the signal processing unit 42d into n optical signals of different wavelengths. For example, the first electric/optic conversion unit 43d converts the radio signal into an optical signal having wavelengths $\lambda 1$ to $\lambda o$. The first electric/optic conversion unit 43d outputs the converted n optical signals to a demultiplexer 46.

A demultiplexer 46 demultiplexes the n optical signals output from the first electric/optic conversion unit 43d. The optical signal demultiplexed by the demultiplexer 46 is input to the phase adjustment units 44-1 to 44-n. For example, an optical signal of a wavelength $\lambda 1$ is input to the phase adjustment unit 44-1, and an optical signal of a wavelength $\lambda n$ is input to the phase adjustment unit 44-n. Thereafter, the flow is the same as that described in the third embodiment.

Fourth Embodiment

In the fourth embodiment, the difference from the first embodiment is that the phase adjustment of the electric signal is performed in the centralized unit. In the fourth embodiment, differences from the first embodiment will be described mainly.

Figure 8:
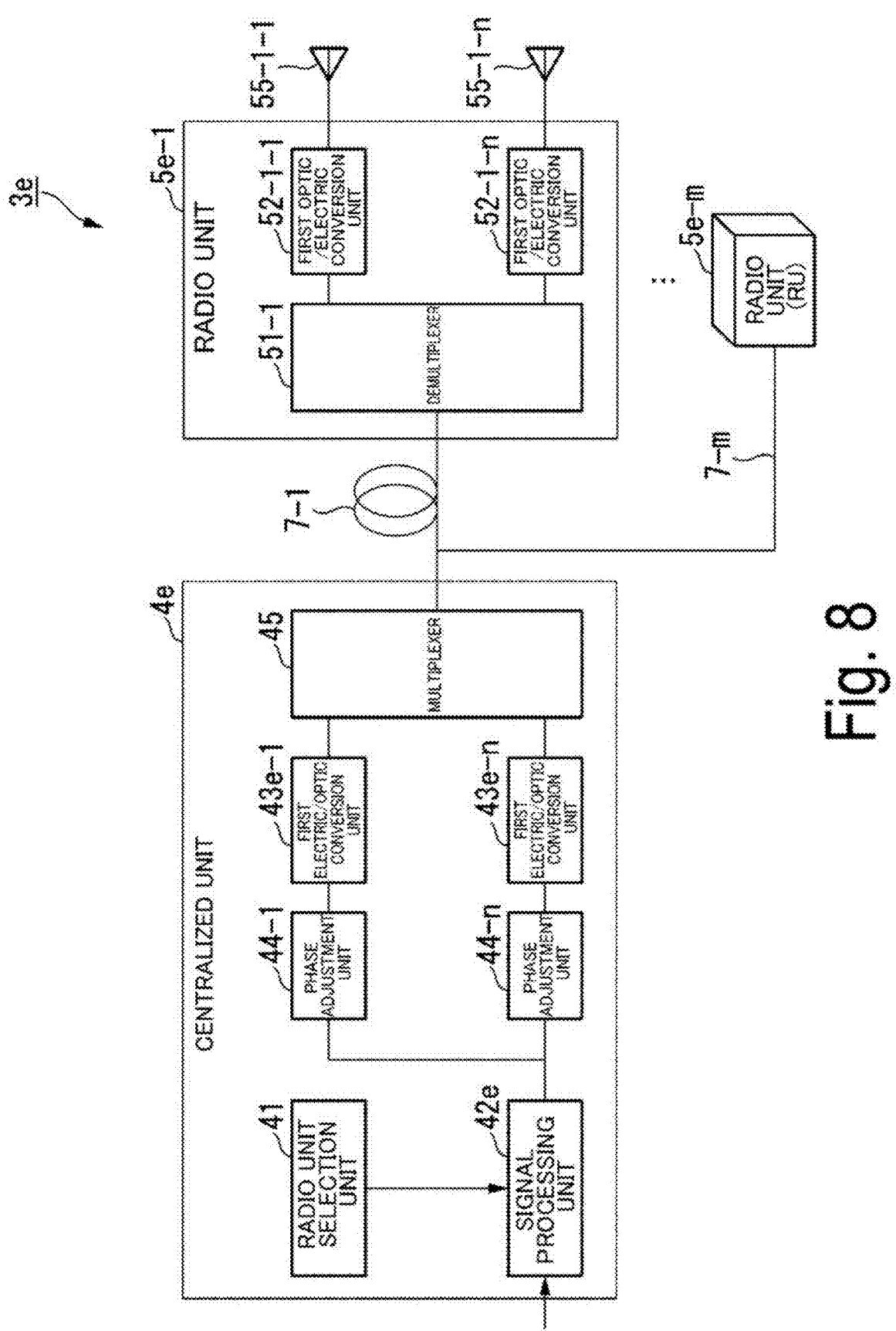
FIG. 8 is a diagram showing a configuration example of a base station according to a fourth embodiment.

FIG. 8 is a diagram showing a configuration example of a base station 3e according to the fourth embodiment. The base station 3e is provided with a centralized unit 4e and a plurality of radio units 5e-1 to 5e-m. The centralized unit 4e corresponds to the centralized unit 4 shown in FIG. 1. The radio units 5e-1 to 5e-m respectively, correspond to the radio units 5-1 to 5-m shown in FIG. 1. Since the radio units 5e-1 to 5e-m have the same configuration, the description will be made with the radio unit 5e-1 as an example.

The centralized unit 4e includes a radio unit selection unit 41, a signal processing unit 42e, a plurality of first electric/optic conversion units 43e-1 to 43e-n, a plurality of phase adjustment units 44-1 to 44-n, and a multiplexer 45. On the output side of the signal processing unit 42e, n combinations (systems) of the phase adjustment unit 44 and the first electric/optic conversion unit 43e are provided.

A signal processing unit 42e performs signal processing on the downstream data output from the host device 2. The signal processing unit 42e outputs radio signals to the phase adjustment units 44-1 to 44-n.

The phase adjustment units 44-1 to 44-n adjusts the phase of the radio signal output from the signal processing unit 42. More specifically, the phase adjustment units 44-1 to 44-n adjusts the phase so as to match the phase of the radio signal input to the phase adjustment units 44-1 to 44-n. As a method of adjusting the phase of the electric domain, a method of adjusting the path length by using a delay device or the like, a method of adjusting the phase of a radio signal by using a phase shifter or the like may be used. The phase adjustment may be performed by an analog signal or a digital signal.

The first electric/optic conversion units 43e-1 to 43e-n converts the phase adjusted radio signal into n optical signals of different wavelengths. For example, the first electric/optic conversion units 43e-1 converts the phase adjusted radio signal into an optical signal having the wavelength $\lambda 1$. For example, the first electric/optic conversion unit 43e-n converts the phase adjusted radio signal into an optical signal having a wavelength $\lambda o$.

The multiplexer 45 multiplexes the optical signals converted by the first electric/optic conversion units 43e-1 to 43e-n. Thus, the multiplexer 45 generates a wavelength division multiplexed optical signal. The multiplexer 45 outputs the wavelength-multiplexed optical signal.

An operation example of the base station 3e will be described below. Here, it is assumed that the radio unit 5e-1 is a communication target radio unit 5e.

The signal processing unit 42e performs signal processing on the radio signal. The signal processing unit 42e outputs the radio signal after the signal processing to a phase adjustment units 44-1 to 44-n. The radio signal output from the signal processing unit 42e is demultiplexed into n pieces and input to the phase adjustment units 44-1 to 44-n. The phase adjustment units 44-1 to 44-n adjust the phase of the input radio signal. The phase adjustment units 44-1 to 44-n output the radio signal after the phase adjustment to the first electric/optic conversion units 43e-1 to 43e-n.

The first electric/optic conversion units 43e-1 to 43e-n converts the radio signal output from the phase adjustment units 44-1 to 44-n into n optical signals of different wavelengths. The first electric/optic conversion units 43e-1 to 43e-n output the converted optical signal to the multiplexer 45. The multiplexer 45 outputs the converted optical signal to the multiplexer 45. The multiplexer 45 wavelength-divides and multiplexes the optical signal converted by the first electric/optic conversion units 43e-1 to 43e-n. The multiplexer 45 transmits the wavelength division multiplexed optical signal to the communication target radio unit 5e (radio unit 5e-1) via an optical fiber 7. For example, the multiplexer 45 transmits the wavelength division multiplexed optical signal through the optical fiber 7-1. The wavelength division multiplexed optical signal is transmitted to a radio unit 5e-1 via an optical fiber 7-1.

Thereafter, in the processing of steps S105 and S106, the optical signal transmitted through the optical fiber 7-1 is demultiplexed by a demultiplexer 51-1, and the demultiplexed optical signal is converted into an electric signal by the first optic/electric conversion units 52-1-1 to 52-1-n. The electric signals converted by the first optic/electric conversion units 52-1-1 to 52-1-n are input to the antenna elements 55-1-1 to 55-1-n. The antenna elements 55-1-1 to 55-1-n radiate radio signals corresponding to the input signals. In this way, the optical signal is transmitted using the analog RoF.

By the base station 3e that has the foregoing configuration, it is possible to obtain similar advantages to the advantages of the first embodiment.

Further, in the base station 3e, the first optic/electric conversion units 52-1-1 to 52-1-n are connected to output side of the demultiplexer 51-1, and the antenna elements 55-1-1 to 55-1-n are connected to output side of the second optic/electric conversion units 52-1-1 to 52-1-n. Thus, the beam formed by the radio unit 5e can be controlled by phase adjustment in the centralized unit 4e.

Fifth Embodiment

In the fifth embodiment, the difference from the first embodiment is that a beam forming circuit is used for forming a beam in the radio unit. In the fifth embodiment, differences from the first embodiment will be described mainly.

Figure 9:
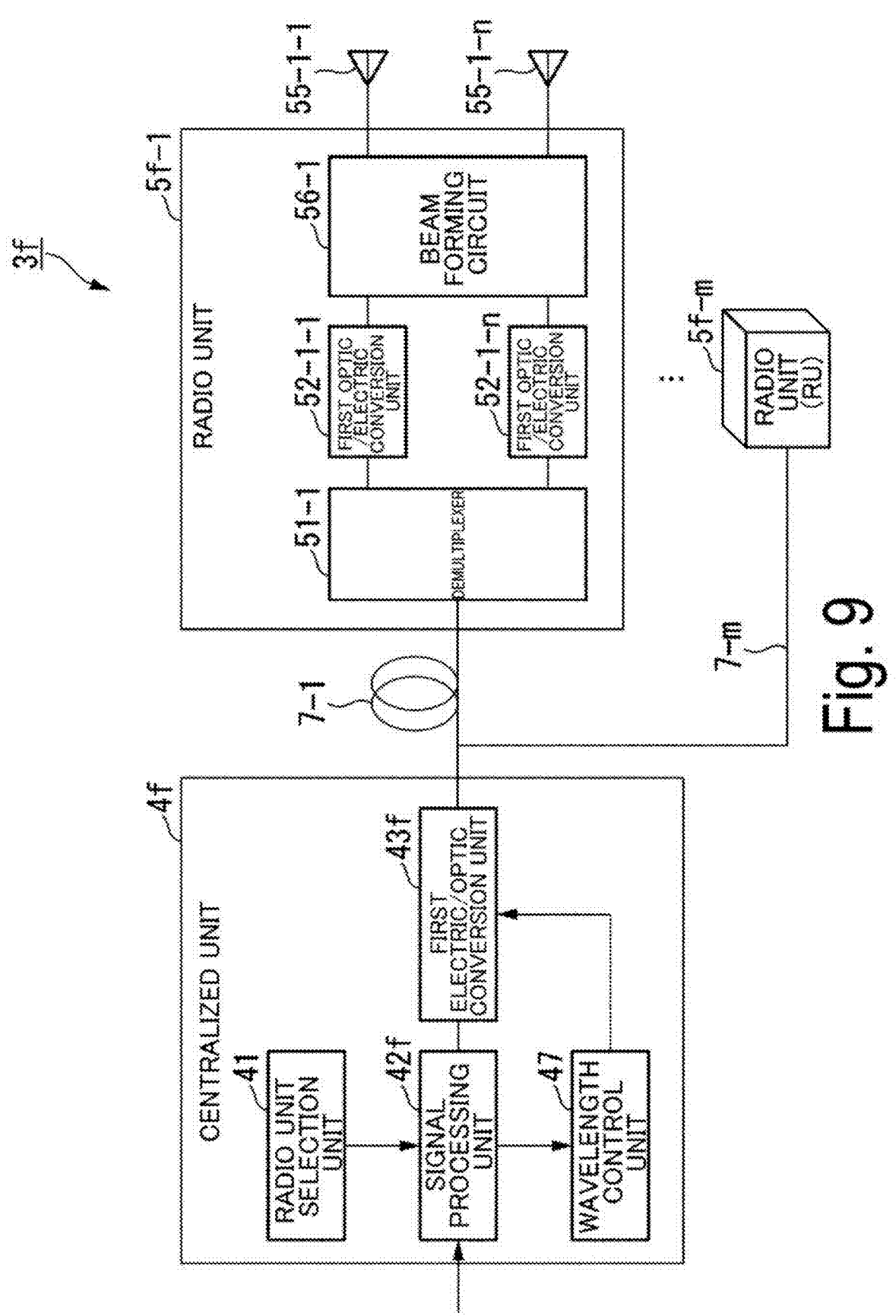
FIG. 9 is a diagram showing a configuration example of a base station according to a fifth embodiment.

FIG. 9 is a diagram showing a configuration example of a base station 3f according to the fifth embodiment. The base station 3f is provided with a centralized unit 4f and a plurality of radio units 5f-1 to 5f-m. The centralized unit 4f corresponds to the centralized unit 4 shown in FIG. 1. The radio unit 5f-1 to 5f-m corresponds to the radio unit 5-1 to 5-m shown in FIG. 1. Since the radio unit 5f-1 to 5f-m have the same configuration, the description will be made with the radio unit 5f-1 as an example.

The centralized unit 4f includes a radio unit selection unit 41, a signal processing unit 42f, a first electric/optic conversion unit 43f, and a wavelength control unit 47.

The signal processing unit 42f performs signal processing on the downstream data output from the host device 2. The signal processing unit 42f outputs the radio signal to the first electric/optic conversion unit 43f and outputs the control signal to the wavelength control unit 47.

The wavelength control unit 47 controls the wavelength of the first electric/optic conversion unit 43f on the basis of the control signal outputted from the signal processing unit 42f. Specifically, the wavelength control unit 47 designates a wavelength when the first electric/optic conversion unit 43f converts the radio signal into the optical signal.

The first electric/optic conversion unit 43f converts the radio signal output from the signal processing unit 42f into an optical signal of a wavelength designated by the wavelength control unit 47.

The radio unit 5f-1 includes a demultiplexer 51-1, a plurality of first optic/electric conversion units 52-1-1 to 52-1-n, a plurality of antenna elements 55-1-1 to 55-1-n, and a beam forming circuit 56-1. The configuration of the radio unit 5f-1 is different from that of the radio unit 5a-1 in the first embodiment in that the radio unit 5f-1 is provided with a beam forming circuit 56-1 instead of the array antenna control unit 53-1 and the array antenna unit 54-1.

The beam forming circuit 56-1 has a plurality of input ports and a plurality of output ports. The first optic/electric conversion units 52-1-1 to 52-1-n are connected to the input ports of the beam forming circuit 56-1. The antenna elements 55-1-1 to 55-1-n are connected to the output ports of the beam forming circuit 56-1. When a signal is input to one input port of the beam forming circuit 56-1, a signal having the same amplitude and a linearly inclined phase is output from the output port. The beam forming circuit 56-1 has different phase slopes for different input ports. The beam forming circuit 56-1 can form a beam in a direction corresponding to the input port. The beam forming circuit is one aspect of an antenna unit.

The beam forming circuit 56-1 has the reversibility of input-output, and when a signal arrives from the direction of the beam corresponding to a certain input port, the signal is outputted only from the input port. The beam forming circuit 56-1 includes, for example, a butler matrix, a brass matrix, a no-run matrix, a Rotman lens, etc., (for example, refer to reference document 1).

(reference document 1: Luo, Q., Gao, S. S., Liu, W., & Gu, C., "Low-cost Smart Antennas", Wiley, p. 253-265)

An operation example of the base station 3f will be described below.

Figure 10:
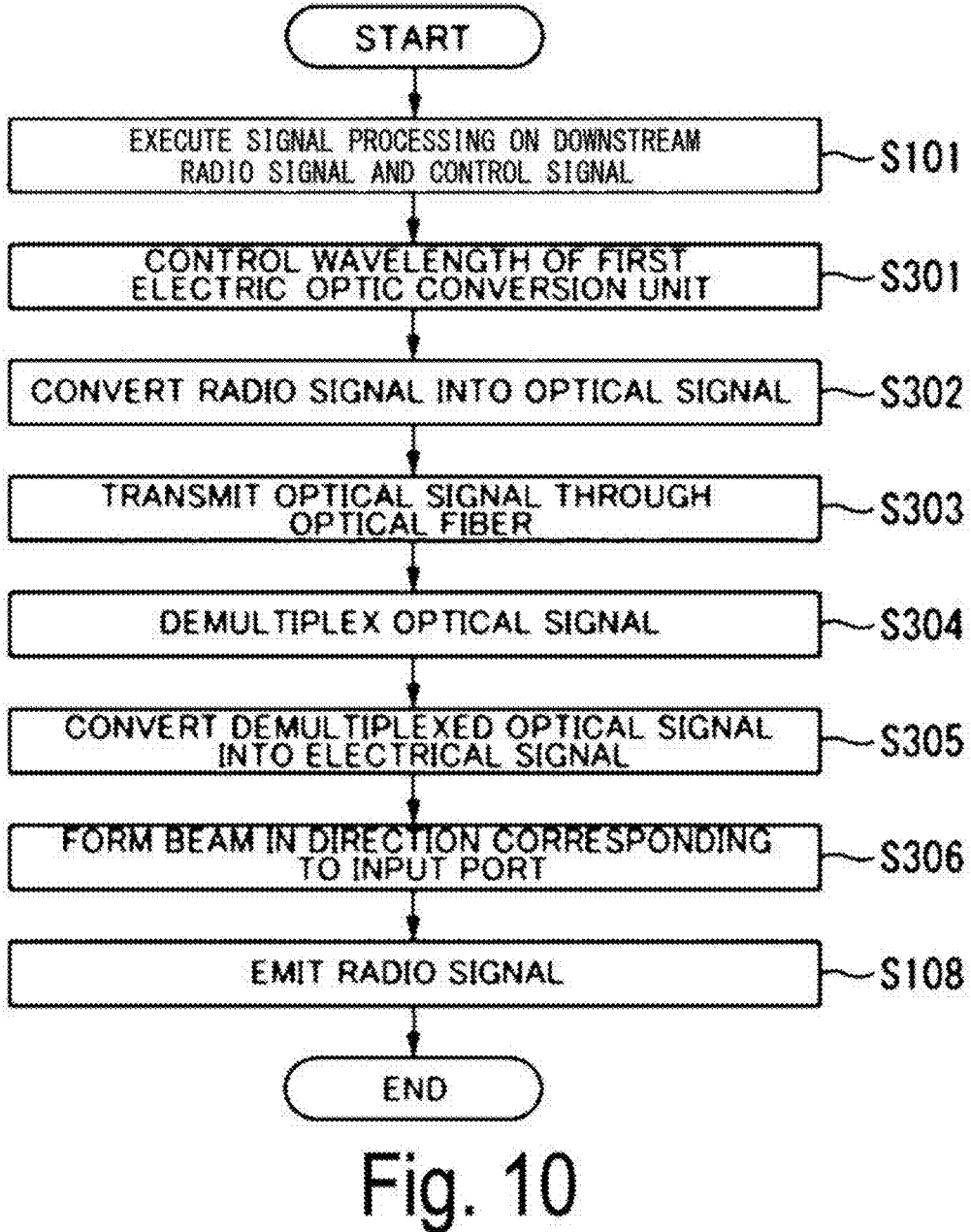
FIG. 10 is a diagram showing an operation example of a base station according to a fifth embodiment.

FIG. 10 is a diagram showing an operation example of the base station 3f according to the fifth embodiment. In FIG. 10, it is assumed that the radio unit 5f-1 is the communication target radio unit 5f.

The signal processing unit 42f performs signal processing on the radio signal and the control signal (step S101). The signal processing unit 42f outputs the radio signal after signal processing to the first optic/electric conversion unit 43f, and outputs the control signal after signal processing to the wavelength control unit 47.

The wavelength control unit 47 controls the wavelength of the first electric/optic conversion unit 43f on the basis of the control signal (step S301). For example, the wavelength control unit 47 designates a wavelength when the first electric/optic conversion unit 43f converts the radio signal into the optical signal on the basis of information on the wavelength included in the control signal. For example, it is assumed that the wavelength information included in the control signal is a wavelength $\lambda 1$. The first electric/optic conversion unit 43f converts the radio signal output from the signal processing unit 42f into an optical signal of a wavelength designated by a wavelength control unit 47 (step S302). For example, the first electric/optic conversion unit 43f converts the radio signal output from the signal processing unit 42f into an optical signal of a wavelength $\lambda 1$ designated by the wavelength control unit 47.

The first electric/optic conversion unit 43f transmits an optical signal of a wavelength $\lambda 1$ to a communication target radio unit 5f (radio unit 5f-1) via an optical fiber 7. For example, the first electric/optic conversion unit 43f transmits an optical signal of a wavelength λ1 by an optical fiber 7-1 (step S303). The optical signal of the wavelength λ1 is transmitted to the radio unit 5f-1 via the optical fiber 7-1.

The radio unit 5f-1 receives the optical signal transmitted through the optical fiber 7-1. The demultiplexer 51-1 demultiplexes the received optical signal (step S304). The optical signal received by the radio unit 5f-1 is an optical signal of a wavelength λ1. Therefore, the optical signal output from the demultiplexer 51-1 is an optical signal having a wavelength λ1. The optical signal output from the demultiplexer 51-1 is input to the first optic/electric conversion unit 52-1-1.

The first optic/electric conversion unit 52-1-1 converts the input optical signal having a wavelength λ1 into an electric signal (step S305). The first optic/electric conversion unit 52-1-1 outputs the electric signal to the beam forming circuit 56-1.

The beam forming circuit 56-1 inputs the electric signal output from the first optic/electric conversion unit 52-1-1. The beam forming circuit 56-1 forms a beam in a direction corresponding to an input port to which an electric signal is input (step S306). As a result, a radio signal is emitted from the antenna element 55-1 connected to the output port corresponding to the input port to which the electric signal is input. The antenna element 55-1 connected to an output port corresponding to an input port to which an electric signal is input radiates a radio signal corresponding to the input electric signal (step S108). In this way, the optical signal is transmitted using the analog RoF.

In the base station 3f that has the foregoing configuration, it is possible to obtain similar advantages to the advantages of the first embodiment.

Further, in the base station 3f, the wavelength is switched by the centralized unit 4f, so that an input port of an electric signal input to a beam forming circuit 56 provided in the radio unit 5f is changed. Thus, the beam direction formed by the beam forming circuit 56 is changed. Thus, in the base station 3f, the direction of the beam formed by the radio unit 5f can be controlled by switching the wavelength by the centralized unit 4f.

Sixth Embodiment

In the sixth embodiment, the difference from the first embodiment is that a reflector antenna is used for forming a beam in the radio unit. In the sixth embodiment, differences from the first embodiment will be described mainly.

Figure 11:
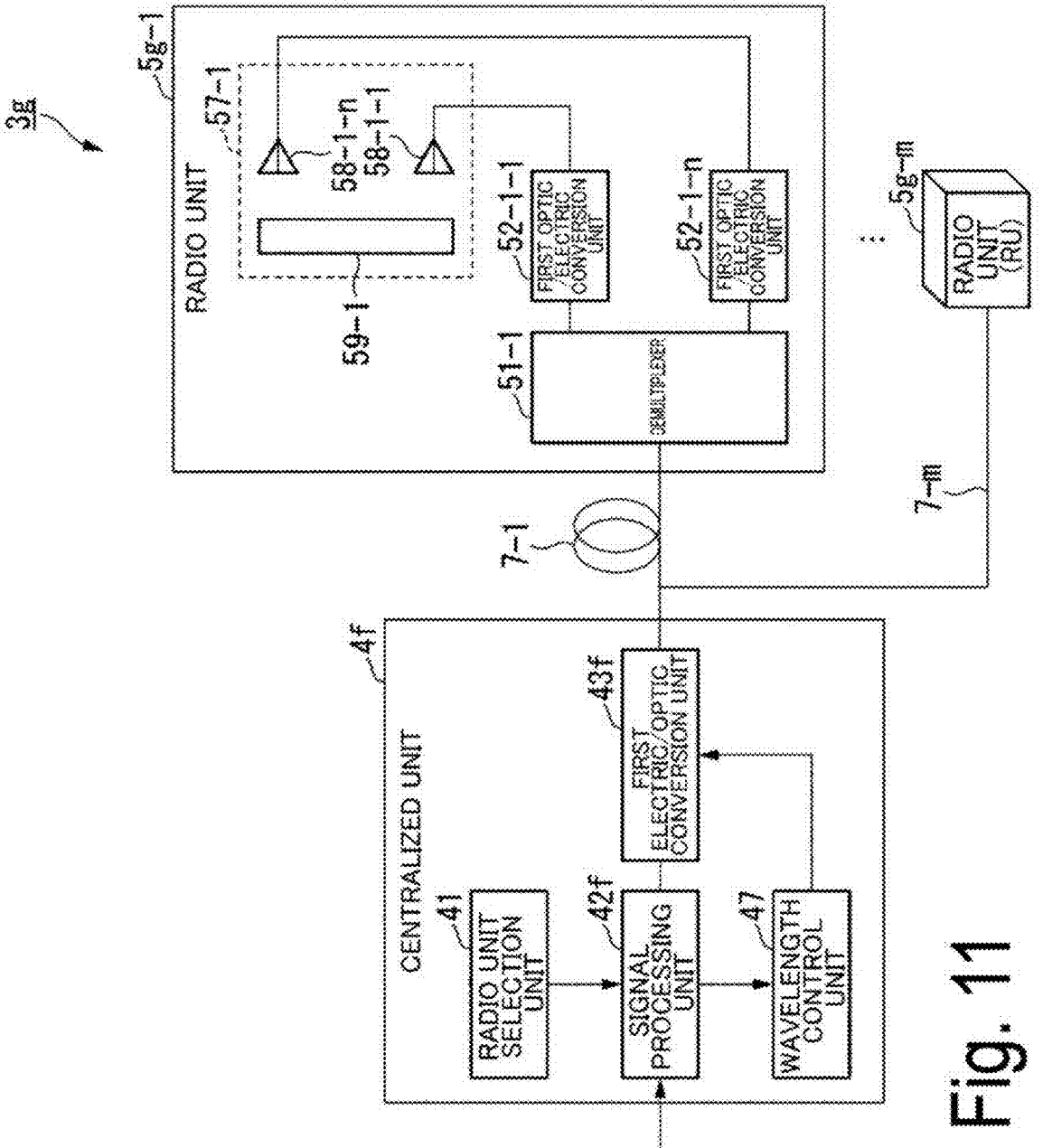
FIG. 11 is a diagram showing a configuration example of a base station according to a sixth embodiment.

FIG. 11 is a diagram showing a configuration example of a base station 3g according to the sixth embodiment. The base station 3g is provided with a centralized unit 4f and a plurality of radio units 5g-1 to 5g-m. The centralized unit 4f corresponds to the centralized unit 4 shown in FIG. 1. The radio units 5g-1 to 5g-m corresponds to the radio unit 5-1 to 5-m shown in FIG. 1. Since the radio units 5g-1 to 5q-m have the same configuration, the description will be made with the radio unit 5g-1 as an example. In the sixth embodiment, the configuration of the centralized unit 4f is the same as the centralized unit 4f in the fifth embodiment, and thus a description thereof is omitted.

The radio unit 5g-1 includes a demultiplexer 51-1, a plurality of first optic/electric conversion units 52-1-1 to 52-1-n, and an antenna unit 57-1. The configuration of the radio unit 5g-1 is different from that of the radio unit 5a-1 in the first embodiment in that the radio unit 5g-1 is provided with an antenna unit 57-1 instead of the array antenna control unit 53-1 and the array antenna unit 54-1.

The antenna unit 57-1 is, for example, a reflector antenna. The antenna unit 57-1 is composed of a plurality of feeds 58-1-1 to 58-1-n, and a reflect array 59-1.

The feeds 58-1-1 to 58-1-n are provided facing the reflect array 59-1, and input electrical signals output from the first optic/electric conversion units 52-1-3 to 52-1-n. The feeds 58-1-1 to 58-1-n radiates a radio signal corresponding to the input electric signal.

The reflect array 59-1 reflects a radio signal radiated from the feeds 58-1-1 to 58-1-n. More specifically, the reflection array 59-1 reflects the radio signal with a phase difference in a direction corresponding to the position of the feeds 58-1-1 to 58-1-n. Thus, the reflect array 59-1 can form a beam in a direction corresponding to the position of the feeds 58-1-1 to 58-1-n. For example, as the antenna unit 57-1 in the sixth embodiment, a reflect array in which elements having a controlled reflection phase are arranged and flattened may be used, (for example, refer to reference document 1).

(reference document 1: Luo, Q., Gao, S. S., Liu, W., & Gu, C., "Low-cost Smart Antennas", Wiley, p. 165-198)

When a radio signal is emitted from one feed 58, the reflection array 59-1 is linearly tilted in phase when reflected by the reflection array, and can form a beam in a certain direction. The gradient of the phase differs depending on the feed 58, and the beam direction differs. The reflect array 59-1 has reversibility of input-output, and when a radio signal arrives from the direction of a beam corresponding to a certain feed 58, the radio signal converges on the feed 58.

An operation example of the base station apparatus 3g will be described below. The processing of the centralized unit 4f is omitted because the processing of the centralized unit 4f has been described in the fifth embodiment. Here, it is assumed that an optical signal of a wavelength λ1 is output in the centralized unit 4f.

The radio unit 5g-1 receives a signal transmitted via the optical fiber 7-1. The demultiplexer 51-1 demultiplexes the received optical signal. The optical signal received by the radio unit 5g-1 is an optical signal having a wavelength λ1. Therefore, the optical signal output from the demultiplexer 51-1 is an optical signal having a wavelength λ1. The optical signal output from the demultiplexer 51-1 is input to the first optic/electric conversion unit 52-1-1.

The first optic/electric conversion unit 52-1-1 converts an optical signal having a wavelength λ1 to an electric signal. The first optic/electric conversion unit 52-1-1 outputs the electric signal to the feed 58-1-1. The feed 58-1-1 radiates a radio signal corresponding to the electric signal output from the first optic/electric conversion unit 52-1-1. The radio signal radiated from the feed 58-1-1 is reflected by the reflect array 59-1, and radiated in a direction corresponding to the position of the feed 58-1-1. In this way, the optical signal is transmitted using the analog RoF.

By the base station 3g that has the foregoing configuration, it is possible to obtain similar advantages to the advantages of the first embodiment.

Furthermore, in the base station 3g, an electric signal input to the feed 58 provided in a radio unit 5g is changed by switching a wavelength by the centralized unit 4f. Thus, the beam direction formed by the antenna unit 57 is changed. Thus, in the base station 3g, the direction of the beam formed by the radio unit 5g can be controlled by switching the wavelength by the centralized unit 4f.

Seventh Embodiment

In the seventh embodiment, the difference from the first embodiment is that a lens antenna is used for forming a beam in the radio unit. In the seventh embodiment, differences from the first embodiment will be described mainly.

Figure 12:
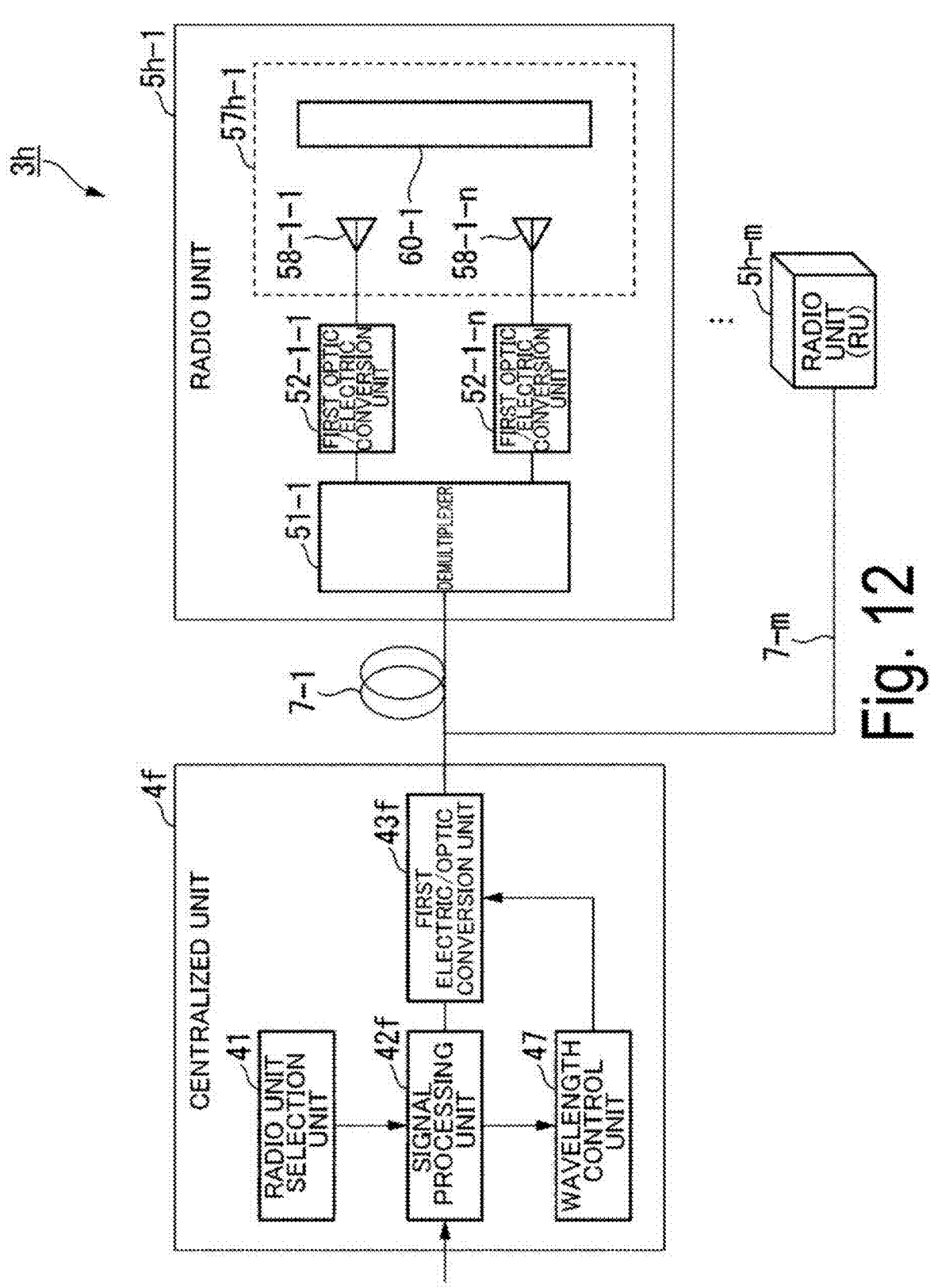
FIG. 12 is a diagram showing a configuration example of a base station according to a seventh embodiment.

FIG. 12 is a diagram showing a configuration example of a base station 3h according to the seventh embodiment. The base station 3h is provided with a centralized unit 4f and a plurality of radio units 5h-1 to 5h-m. The centralized unit. 4f corresponds to the centralized unit 4 shown in FIG. 1. The radio units 5h-1 to 5h-m correspond to the radio unit 5-1 to 5-m shown in FIG. 1. Since the radio units 5h-1 to 5h-m have the same configuration, the radio unit 5h-1 will be described as an example. In the seventh embodiment, the configuration of the centralized unit 4f is the same as the centralized unit 4f in the fifth embodiment, and thus a description thereof is omitted.

The radio unit 5f-1 includes a demultiplexer 51-1, a plurality of first optic/electric conversion units 52-1-1 to 52-1-n, and an antenna section 57h-1. The configuration of the radio unit 5h-1 is different from that of the radio unit 5a-1 in the first embodiment in that the radio unit 5h-1 is provided with an antenna section 57h-1 instead of the array antenna control unit 53-1 and the array antenna unit 54-1.

The antenna unit 57h-1 is, for example, a lens antenna. The antenna unit 57h-1 is composed of a plurality of feeds 58-1-1 to 58-1-n, and a transmit array 60-1.

The electric signals output from the first optic/electric conversion unit 52-1-1 to 52-1-n are input to the feeds 58-1-1 to 58-1-n. The feeds 58-1-1 to 58-1-n radiates a radio signal corresponding to the input electric signal.

The transmit array 60-1 transmits a radio signal radiated from the feed feeds 58-1-1 to 58-1-n with a phase difference in a direction corresponding to the position of the feeds 58-1-1 to 58-1-n. As a result, the transmit array 60-1 can form a beam in a direction corresponding to the position of the feeds 58-1-1 to 58-1-n. For example, as the antenna section 57f-1 in the seventh embodiment, a transmit array in which elements whose transmission phase is controlled are arranged and flattened may be used (for example, refer to reference document 1).

(reference document 1: Luo, Q., Gao. S. S., Liu, W., & Gu. C., "Low-cost Smart Antennas", Wiley, p. 165-198)

An operation example of the base station apparatus 3h will be described below. The processing of the centralized unit 4f is omitted because the processing of the centralized unit 4f has been described in the fifth embodiment. Here, it is assumed that an optical signal of a wavelength λ1 is output in the centralized unit 4f.

The radio unit 5h-1 receives a signal transmitted via the optical fiber 7-1. The demultiplexer 51-1 demultiplexes the received optical signal. The optical signal received by the radio unit 5h-1 is an optical signal having a wavelength λ1. Therefore, the optical signal output from the demultiplexer 51-1 is an optical signal having a wavelength λ1. The optical signal output from the demultiplexer 51-1 is input to the first optic/electric conversion unit 52-1-1.

The first optic/electric conversion unit 52-1-1 converts the input optical signal having a wavelength λ1 to an electric signal. The first optic/electric conversion unit 52-1-1 outputs the electric signal to the feed 58-1-1. The feed 58-1-1 radiates a radio signal corresponding to the electric signal output from the first optic/electric conversion unit 52-1-1. The radio signal radiated from the feed 58-1-1 transmits the transmit array 60-1, and is radiated in a direction corresponding to the position of the feed 58-1-1. In this way, the optical signal is transmitted using the analog RoF.

By the base station 3h that has the foregoing configuration, it is possible to obtain similar advantages to the advantages of the first embodiment.

Further, in the base station 3h, an electric signal input to the feed 58 provided in a radio unit 5h is changed by switching a wavelength by a centralized unit 4f. Thus, the beam direction formed by the antenna unit 57h is changed.

Thus, in the base station 3h, the direction of the beam formed by the radio unit 5h can be controlled by switching the wavelength by the centralized unit 4f.

Eighth Embodiment

In the eighth embodiment, the difference from the first embodiment is that each radio unit receives an upstream optical signal. In the eighth embodiment, differences from the first embodiment will be described mainly.

In the eighth embodiment, each radio unit 5 shown in FIG. 1 transmits an optical signal corresponding to an upstream radio signal to a centralized unit 4 using an analog RoF. The centralized unit 4 generates upstream data by executing predetermined signal processing on an optical signal corresponding to the upstream radio signal. The host device 2 acquires upstream data from the centralized unit (CU) 4.

Figure 13:
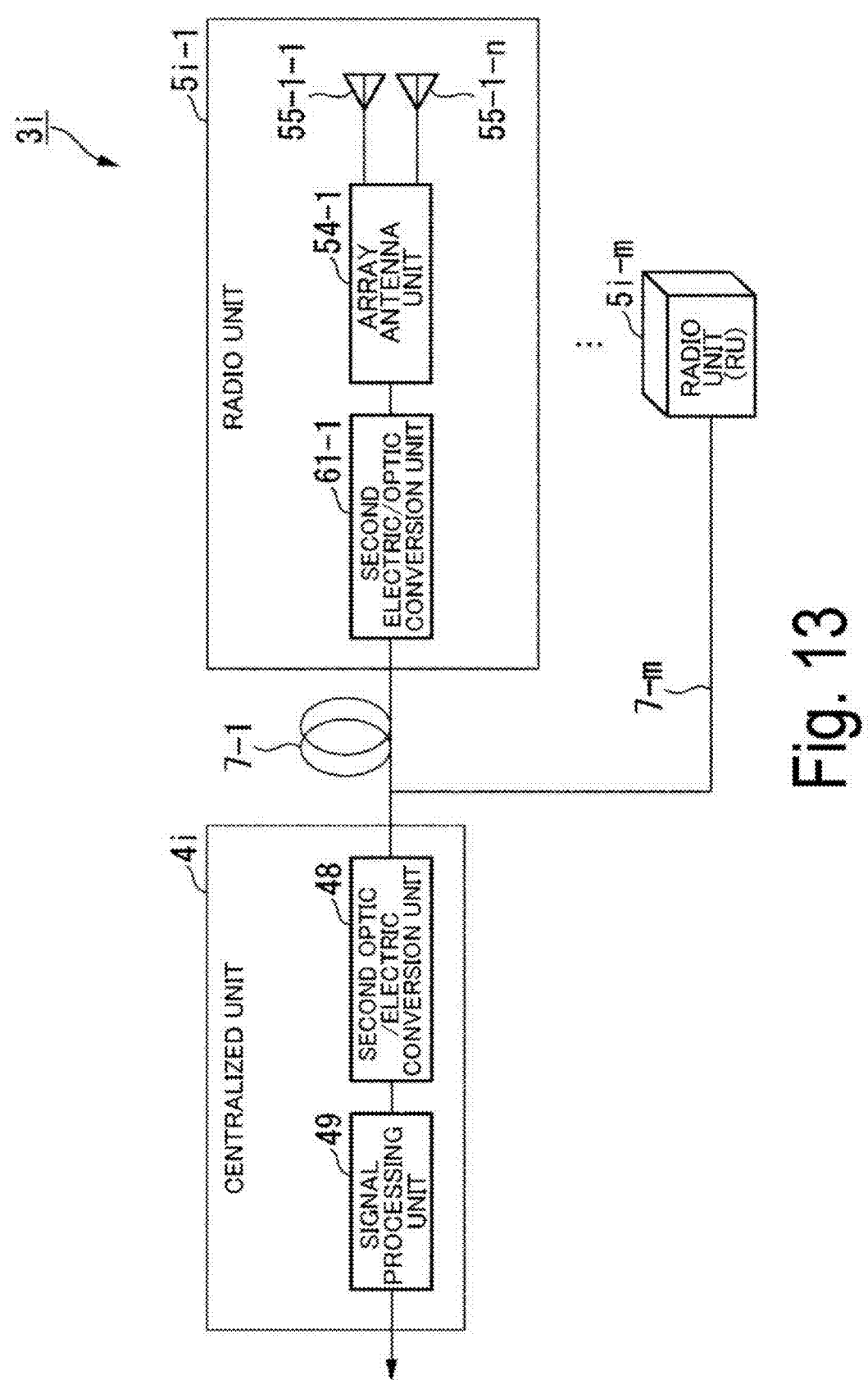
FIG. 13 is a diagram showing a configuration example of a base station according to an eighth embodiment.

FIG. 13 is a diagram showing a configuration example of a base station 3i according to the eighth embodiment. The base station 3i includes a centralized unit 4i and a plurality of radio units 5i-1 to 5i-m. The centralized unit 4i corresponds to the centralized unit 4 shown in FIG. 1. The radio units 5i-1 to 5i-m corresponds to the radio units 5-1 to 5-m shown in FIG. 1. The radio units 5i-1 to 5i-m transmits an upstream optical signal to the centralized unit 4i by using the analog RoF. Since the radio units 5i-1 to 5i-m have the same configuration, the radio unit 5i-1 will be described as an example.

The radio unit 5i-1 includes a second electric/optic conversion unit 61-1, an array antenna unit 54-1, and antenna elements 55-1-1 to 55-1-n.

The array antenna unit 54-1 receives a radio signal transmitted from the wireless terminal 8 via the antenna elements 55-1-1 to 55-1-n.

The second electric/optic conversion unit 61-1 converts the radio signal received via the antenna elements 55-1-1 to 55-1-n.

The centralized unit 4i includes a second optic/electric conversion unit 48 and a signal processing unit 49.

The second optic/electric conversion unit 48 converts an optical signal received via the optical fiber 7 into an electric signal.

The signal processing unit 49 generates upstream data by performing signal processing on the electric signal converted by the second optic/electric conversion unit 48.

An operation example of the base station 3i will be described below.

Figure 14:
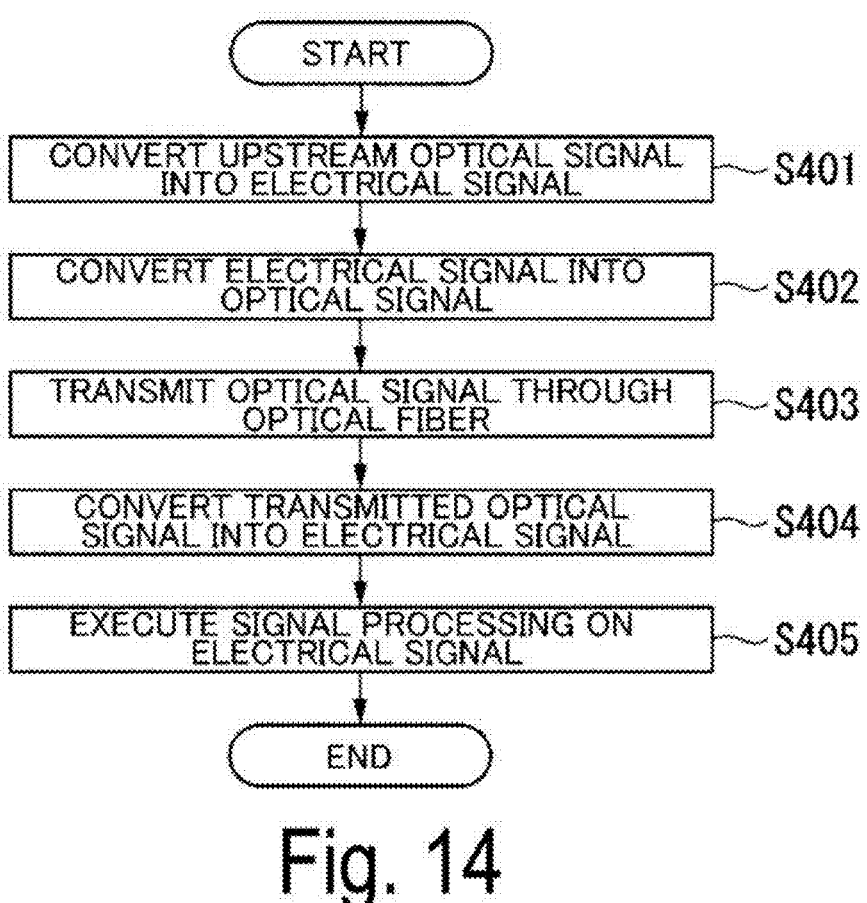
FIG. 14 is a diagram showing an operation example of a base station according to the eighth embodiment.

FIG. 14 is a diagram showing an operation example of the base station 3i according to the eighth embodiment.

The array antenna unit 54-1 receives a radio signal transmitted from the wireless terminal 8 via the antenna elements 55-1-1 to 55-1-n. The array antenna unit 54-1 converts the received radio signal into an electric signal (step S401). The array antenna unit 54-1 outputs an electric signal corresponding to the upstream radio signal to the second electric/optic conversion unit 61-1. The second electric/optic conversion unit 61-1 converts the electric signal output from the array antenna unit 54-1 into an optical signal (step S402). At this time, the second electric/optic conversion unit 61-1 converts the radio signal into an optical signal by modulating the intensity of the optical signal with the radio signal. Thus, analog RoF transmission can be performed from the radio unit 5*i*-1 to the centralized unit 4*i*.

A second electric/optic conversion unit 61-1 transmits the converted optical signal via an optical fiber 7-1 (step S403). The optical signal transmitted via the optical fiber 7-1 is received by a centralized unit 4*i*. The second optic/electric conversion unit 48 converts the optical signal received via the optical fiber 7 into an electric signal (step S404). The second optic/electric conversion unit 48 outputs the converted electrical signal to the signal processing unit 49.

The signal processing unit 49 performs signal processing on the electric signal output from the fourth optic/electric conversion unit 48 (step S405). As a result, the signal processing unit 49 generates upstream data.

By the base station 3*i* that has the foregoing configuration, it is possible to obtain similar advantages to the advantages of the first embodiment on the upward direction.

In the second to seventh embodiments, as in the eighth embodiment, each radio unit may receive an upstream optical signal and transmit the signal to the centralized unit. In the case of this configuration, the centralized unit and the radio unit 5 in each embodiment are configured as follows.
(Configuration of Upward Direction According to Second Embodiment)

The centralized unit 4*b* and the radio units 5*b*-1 to 5*b*-*m* in the second embodiment have the same configuration as the centralized unit 4*i* and the radio units 5*i*-1 to 5*i*-*m* in the eighth embodiment.
(Configuration of Upward Direction According to Third Embodiment)

The radio units 5*c*-1 to 5*c*-*m* in the third embodiment includes a plurality of second electric/optic conversion unit 61-1-1 to second electric/optic conversion unit 61-1-*n* instead of the first optic/electric conversion unit 52-1-1 to the first optic/electric conversion unit 52-1-*n*, and a multiplexer instead of the demultiplexer 51-1. Here, the multiplexer performs wavelength division multiplexing of the optical signal output from the second electric/optic conversion unit 61-1-1 to the second electric/optic conversion unit 61-1-*n*. The centralized unit 4*c* in a third embodiment includes a demultiplexer instead of the multiplexer 45, a plurality of second optic/electric conversion units 48-1 to 48-*n* instead of the first electric/optic conversion units 43*c*-1 to 43*c*-*n*, and a signal processing unit 49 instead of the signal processing unit 42*c*. In this case, the demultiplexer demultiplexes the optical signal input through the optical fiber 7. The phase adjustment unit 44-1 to 44-*n* adjusts the phase of the optical signal output from the demultiplexer. The second optic/electric conversion unit 48-1 to 48-*n* converts the optical signal after the phase adjustment into n electric signals.
(Configuration of Upward Direction According to Modification Example of Third Embodiment)

The radio units 5*d*-1 to 5*d*-*m* in the modification example of the third embodiment includes a plurality of second electric/optic conversion unit 61-1-1 to second electric/optic conversion unit 61-1-*n*, instead of the first optic/electric conversion unit 52-1-1 to the first optic/electric conversion unit 52-1-*n*, and a multiplexer instead of the demultiplexer 51-1. Here, the multiplexer performs wavelength division multiplexing of the optical signal output from second electric/optic conversion unit 61-1-1 to third optic/electric conversion unit 61-1-*n*.

The centralized unit 4*d* in the modification example of the third embodiment includes a demultiplexer instead of the multiplexer 45, a multiplexer instead of the demultiplexer 46, the second optic/electric conversion units 48-1 to 48-*n* instead of the first electric/optic conversion unit 43*d*, and a signal processing unit 49 instead of the signal processing unit 42*d*. In this case, the demultiplexer demultiplexes the optical signal input through the optical fiber 7. The phase adjustment units 44-1 to 44-*n* adjust the phase of the optical signal output from the demultiplexer. The multiplexer multiplexes the optical signals whose phases are adjusted by the phase adjustment units 44-1 to 44-*n*. The fourth optic/electric conversion unit 48-1 converts the multiplexed signal by the multiplexer to an electric signal.
(Configuration of Upward Direction According to Fourth Embodiment)

The radio units 5*e*-1 to 5*e*-*m* in the fourth embodiment includes a plurality of second electric/optic conversion unit 61-1-1 to second electric/optic conversion unit 61-1-*n* instead of the first optic/electric conversion unit 52-1-1 to the first optic/electric conversion unit 52-1-*n*, and a multiplexer instead of the demultiplexer 51-1. In this case, the multiplexer wavelength-divides and multiplexes the optical signal output from the second electric/optic conversion unit 61-1-1 to the optical signal output from the second electric/optic conversion unit 61-1-*n*.

The centralized unit 4*e* in the fourth embodiment includes a demultiplexer instead of the multiplexer 45, the second optic/electric conversion units 48-1 to 48-*n* instead of the first optic/electric conversion units 43*e*-1 to 43*e*-*n*, and a signal processing unit 49 instead of the signal processing unit 42*e*. In this case, the demultiplexer demultiplexes the optical signal input through the optical fiber 7. The second optic/electric conversion units 48-1 to 48-*n* converts the optical signal outputted from the demultiplexer into an electric signal. The phase adjustment units 44-1 to 44-*n* adjust the phase of the electric signal output from the forth optic/electric conversion unit 48-1 to 48-*n*.
(Configuration of Upward Direction According to Fifth Embodiment)

The radio units 5*f*-1 to 5*f*-*m* in the fifth embodiment includes a plurality of second electric/optic conversion unit 61-1-1 to second electric/optic conversion unit 61-1-*n* instead of the first optic/electric conversion unit 52-1-1 to the first optic/electric conversion unit 52-1-*n*, and a multiplexer instead of the demultiplexer 51-1. In this case, the beam forming circuit 56-1 outputs a radio signal from an input port corresponding to an output port to which the antenna elements 55-1-1 to 55-1-*n* which has received the radio signal are connected. The second electric/optic conversion units 61-1 to 61-*n* convert the radio signal output from the input ports of the beam forming circuit 56-1 into an optical signal. The multiplexer wavelength-divides and multiplexes the optical signal output from the second electric/optic conversion unit 61-1-1 to the second electric/optic conversion unit 61-1-*n*. The centralized unit 4*f* in the fifth embodiment includes a second optic/electric conversion unit 48 instead of the first electric/optic conversion unit 43*f*, and a signal processing unit 49 instead of the signal processing unit 42*d*.
(Configuration of Upward Direction According to Sixth Embodiment)

The radio units 5*g*-1 to 5*g*-*m* in the sixth embodiment includes a plurality of second electric/optic conversion units 61-1-1 to second electric/optic conversion units 61-1-*n* instead of the first optic/electric conversion unit 52-1-1 to the first optic/electric conversion unit 52-1-*n*, and a multiplexer instead of the demultiplexer 51-1. In this case, the antenna unit 57-1 outputs a radio signal to the second electric/optic conversion units 61-1 to 61-*n* to which the feed

58-1-1 to 58-1-$n$ which has received the radio signal are connected. The second electric/optic conversion units 61-1 to 61-$n$ convert the radio optical signal output from the feeds 58-1-1 to 58-1-$n$ which have received the radio signal into an optical signal. The multiplexer wavelength-divides and multiplexes the optical signal output from the third optic/electric conversion unit 61-1-1 to the third optic/electric conversion unit 61-1-$n$. The centralized unit 4$f$ in the sixth embodiment includes a second optic/electric conversion unit 48 instead of the first electric/optic conversion unit 43$f$, and a signal processing unit 49 instead of the signal processing unit 42$d$.

(Configuration of Upward Direction According to Seventh Embodiment)

The radio units 5$h$-1 to 5$h$-$m$ in the seventh embodiment includes a plurality of second electric/optic conversion units 61-1-1 to second electric/optic conversion units 61-1-$n$ instead of the first optic/electric conversion unit 52-1-1 to the first optic/electric conversion unit 52-1-$n$, and a multiplexer instead of the demultiplexer 51-1. In this case, the antenna section 57$h$-1 outputs a radio signal to the second electric/optic conversion units 61-1 to 61-$n$ to which the feeds 58-1-1 to 58-1-$n$ which has received the radio signal are connected. The second electric/optic conversion units 61-1 to 61-$n$ convert the radio signal output from the feeds 58-1-1 to 58-1-$n$ which have received the radio signal into an optical signal. The multiplexer wavelength-divides and multiplexes the optical signal output from the second electric/optic conversion unit 61-1-1 to the second electric/optic conversion unit 61-1-$n$.

The centralized unit 4$f$ in the seventh embodiment includes a second optic/electric conversion unit 48 instead of the first electric/optic conversion unit 43$f$, and a signal processing unit 49 instead of the signal processing unit 42$d$.

(About Second Communication Mode)

The above explanation describes the configuration for the first communication mode between the radio unit 5 and the wireless terminal 8-$i$. Next, the configuration for the second communication mode between the radio unit 5 and the wireless terminal 8-$i$ will be described. In the second communication mode, a plurality of radio units 5-1 to 5-$m$ and a single wireless terminal 8-$i$ communicates with each other. Here, as an example, the case where the radio unit 5 is two units (radio unit 5-1 to 5-2) will be described. The radio unit 5-1 to 5-2 in the second communication mode transmits a different signal to a single wireless terminal 8-$i$. When the single wireless terminal 8-$i$ has a plurality of antennas, MIMO communication becomes possible. That is, when the single wireless terminal 8-$i$ has a plurality of antennas, the single wireless terminal 8-$i$ receives the radio signals transmitted from the respective radio units 5-1 to 5-2 and separates them by signal processing.

The centralized unit 4 or the wireless terminal 8-$i$ may use common signal processing methods (e.g., MIMO signal processing methods such as ZF (Zero Forcing), MMSE (Minimum Mean Squared Error), MLD (Maximum Likelihood Detection), etc.) to separate received signals. The radio unit 5-1 to 5-2 may transmit the same signal to a single wireless terminal 8-$i$, and the centralized unit 4 or the wireless terminal 8-$i$ may perform in-phase synthesis by using signal processing.

The radio units 5-1 to 5-2 in the second communication mode forms a beam according to the control of the centralized unit 4. The configuration of the radio units 5-1 to 5-2 and the centralized unit 4 in the downward direction is any of the configurations of the first to seventh embodiments described above. The plurality of radio unite 5-1 to 5-2 may have the same configuration or different configurations. When the plurality of radio units 5-1 to 5-2 are configured differently, the centralized unit 4 has a configuration corresponding to the configuration of each radio unit 5. For example, when the radio unit 5-1 is a configuration of the radio unit 5-1 in the first embodiment (radio unit 5$a$-1), and the radio unit 5-2 is a configuration of the radio unit 5-1 in the third embodiment (radio unit 5$c$-1), the centralized unit 4 aggregates the configuration of the centralized unit 4 in the first embodiment (centralized unit 4$a$) and the configuration of the centralized unit 4 in the third embodiment (centralized unit 4$c$). It is to be noted that a plurality of overlapping structures may not be provided.

In the second communication mode, the configuration of the radio units 5-1 to 5-2 and the centralized unit 4 in the upward direction is any one of the above-mentioned eighth embodiment and the configuration in the upward direction in the second to seventh embodiments.

(About Third Communication Mode)

The above explanation describes the configuration for the first communication mode between the radio unit 5 and the wireless terminal 8-$i$. Next, the configuration for the third communication mode between the radio unit 5 and the wireless terminal 8-$i$ will be described. In the third communication mode, a single radio unit 5 and a plurality of wireless terminals 8-$i$ communicates with each other. Here, as an example, a case where a plurality of wireless terminals 8 are two wireless terminals (wireless terminals 8-1 to 8-2) will be described. In the third communication mode, the centralized unit 4 selects a communication target radio unit 5 from among a plurality of radio units 5-1 to 5-$m$. The communication target radio unit 5 in the third communication mode forms a beam according to control of the centralized unit 4. The configuration of the radio units 5-1 to 5-$m$ and the centralized unit 4 in the downward direction is any of the configurations of the first to seventh embodiments described above. The plurality of radio units 5-1 to 5-$m$ may have the same configuration or may have different configurations. When the plurality of radio units 5-1 to 5-$m$ are configured differently, the centralized unit 4 has a configuration corresponding to the configuration of each radio unit 5. It is to be noted that a plurality of overlapping structures may not be provided.

The centralized unit 4 may use common signal processing methods (e.g., MIMO signal processing methods such as ZF, MMSE, MLD, etc.) to separate received signals.

In the third communication mode, the configuration of the radio unit 5-1 to 5-$m$ and the centralized unit 4 in the upward direction is any one of the above-mentioned configurations in the eighth embodiment and the configuration in the upward direction in the second to seventh embodiments.

(About Forth Communication Mode)

The above explanation describes the configuration for the first communication mode between the radio unit 5 and the wireless terminal 8-$i$. Next, the configuration for the fourth communication mode between the radio unit 5 and the wireless terminal 8-$i$ will be described. In the fourth communication mode, a plurality of radio units 5-1 to 5-$m$ and a plurality of wireless terminals 8-$i$ communicates with each other. The fourth communication mode is a combination of the second communication mode and the third communication mode. Here, as an example, the case where there are three radio units 5 (radio units 5-1 to 5-3) and two wireless terminals 8-$i$ (wireless terminals 8-1 to 8-2) will be described. In this case, for example, the radio units 5-1 to 5-2 may operate as the radio unit 5 in the second communication mode, and the radio unit 5-3 may operate as the radio unit 5 in the third communication mode. When there are two radio units 5, one of the radio units 5-1 and 5-2 operates as the radio unit 5 in the second communication mode and the radio unit 5 in the third communication mode.

A radio unit 5-1 to 5-2 in the fourth communication mode forms a beam according to the control of the centralized unit 4. The configuration of the radio unit 5-1 to 5-2 and the centralized unit 4 in the downward direction is any of the configurations of the first to seventh embodiments described above. The plurality of radio units 5-1 to 5-2 may have the same configuration or different configurations. When the plurality of radio units 5-1 to 5-2 are configured differently, the centralized unit 4 has a configuration corresponding to the configuration of each radio unit 5.

In the fourth communication mode, the configuration of the radio unit 5-1 to 5-2 and the centralized unit 4 in the upward direction is any one of the above-mentioned configurations of the eighth embodiment and the configuration of the upward direction in the second to seventh embodiments.

(Hardware Configuration Example)

Figure 15:
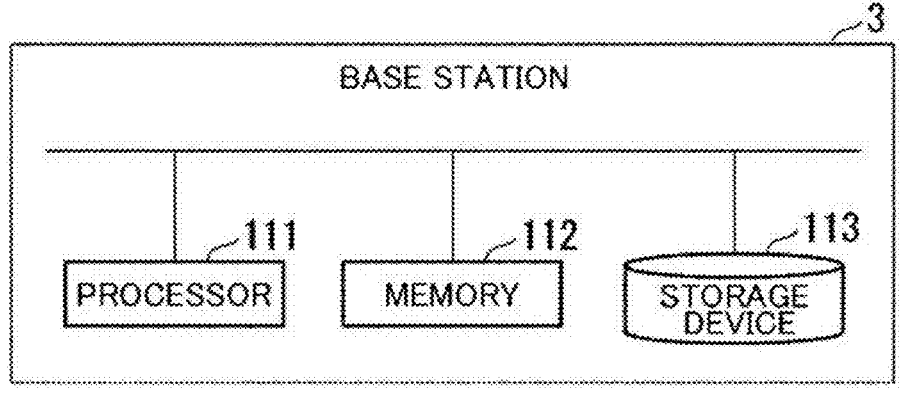
FIG. 15 is a diagram showing a hardware configuration example of a base station according to each embodiment.
Figure 16:
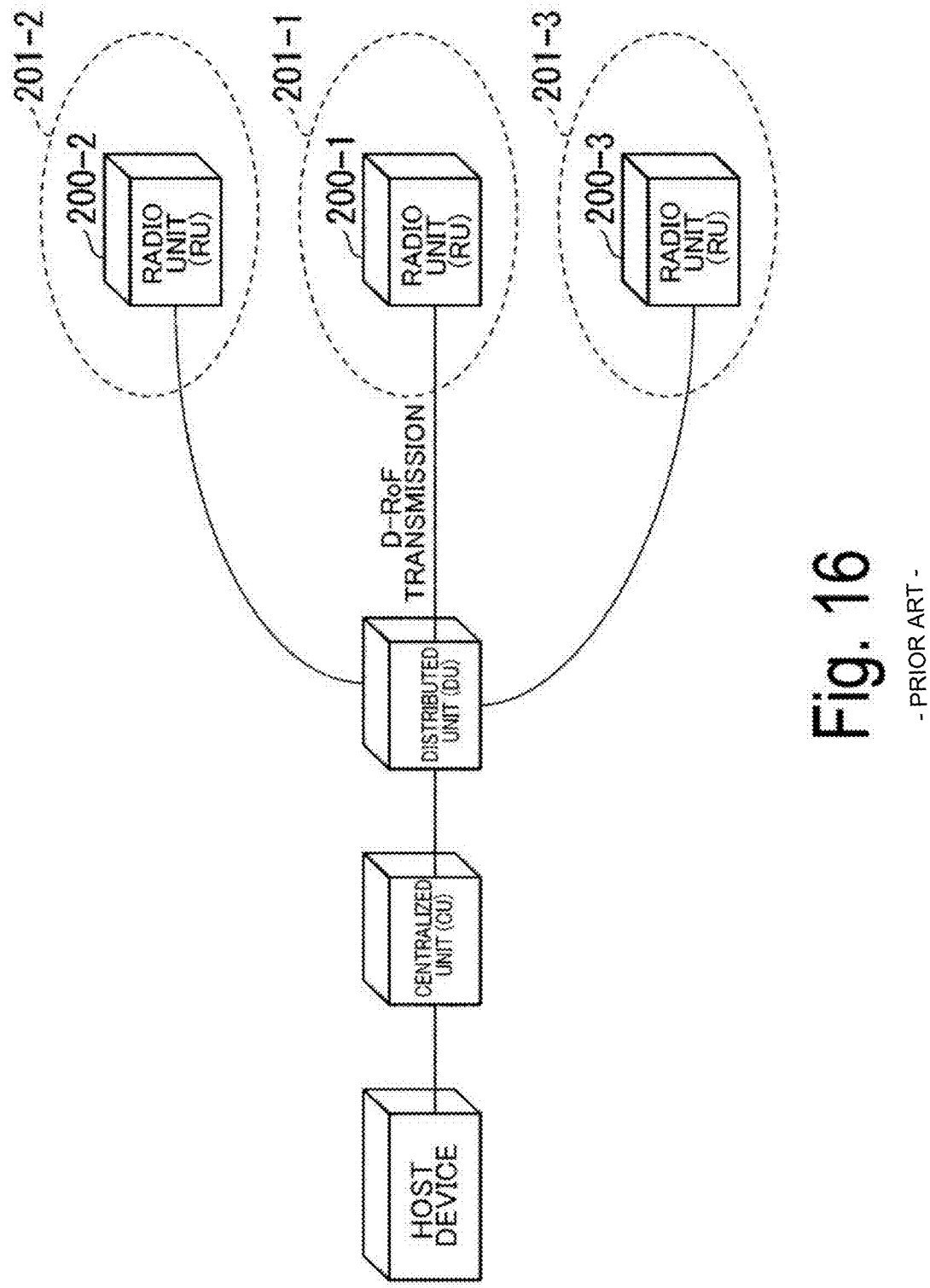
FIG. 16 is a diagram showing a configuration example of a conventional wireless communication system.

FIG. 15 is a diagram showing a hardware configuration example of the base station 3 to 3i (wireless communication device) in each embodiment. A part or all of each functional unit of the base station 3 to 3i is realized as software by a processor 111 such as CPU (Central Processing Unit) executing a program stored in memory 113 and memory 112 with a nonvolatile recording medium (non-transient recording medium). The program may be recorded on a computer-readable recording medium. The computer-readable recording media are non-transitory recording media, such as flexible disks, optical magnetic disks, ROM (Read Only Memory), CD-ROM (Compact Disc Read Only Memory) and other portable media, and hard disks and other storage devices built into computer systems.

Some or all of the functional parts of base stations 3 to 3i may be realized using hardware including electronic circuits (electronic circuit or circuitry) using for example, LSI (Large Scale Integrated circuit), ASIC (Application Specific Integrated Circuit), PLD (Programmable Logic Device) or FPGA (Field Programmable Gate Array) or the like.

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention is applicable to a wireless communication system.

REFERENCE SIGNS LIST

1 Wireless communication system
2 Host device
3, 3a, 3b, 3c, 3d, 3e, 3f, 3g, 3h, 3i Base station
4, 4a, 4b, 4c, 4d, 4e, 4f Centralized unit
5, 5a, 5b, 5c, 5d, 5e, 5f, 5g, 5h, 5i Radio unit
7 Optical fiber
41 Radio unit selection unit
42, 42c, 42d, 42e, 42f, 49 Signal processing unit
43, 43b, 43c, 43d, 43e, 43f First electric/optic conversion unit
44 Phase adjustment unit
45 Multiplexer

46 Demultiplexer
47 Wavelength control unit
48 Second optic/electric conversion unit
51, 51b Demultiplexer
52, 52b First optic/electric conversion unit
53 Array antenna control unit
54 Array antenna unit
55 Antenna element
56 Beam forming circuit
57, 5h Antenna unit
58 Feed
59 Reflect array
60 Transmit array
61 Second electric/optic conversion unit
111 Processor
112 Memory
113 Storage device
200 Radio unit

The invention claimed is:

1. A wireless communication method wherein:

among a signal processing function and a communication function provided by a wireless communication device, a centralized unit having a signal processing function transmits an optical signal having a form corresponding to a downstream radio signal to be transmitted by the communication function to a communication target radio unit which wirelessly communicates with an external communication device among two or more radio units having the communication function directly connected to the centralized unit via an optical fiber, and performs beamforming control of the communication target radio unit;

the communication target radio unit communicates with the external communication device in accordance with control of the centralized unit, wherein:

the centralized unit converts the downstream radio signal and the control signal into a plurality of optical signals and multiplexes the plurality of optical signals to generate the optical signals;

and the communication target radio unit demultiplexes the optical signal into a plurality of optical signals, and transmits the downstream radio signal obtained by conversion to the external communication device, on the basis of the control signal obtained by converting the plurality of optical signals into a plurality of analog electric signals.

2. The wireless communication method according to claim 1, wherein the centralized unit converts the downstream radio signal and the control signal into a plurality of optical signals having different wavelengths and performs wavelength division multiplexing to generate the optical signal.

3. The wireless communication method according to claim 1, wherein the centralized unit generates the optical signal by subcarrier-multiplexing a downstream radio signal and a control signal.

4. A wireless communication method wherein:

among a signal processing function and a communication function provided by a wireless communication device, a centralized unit having a signal processing function transmits an optical signal having a form corresponding to a downstream radio signal to be transmitted by the communication function to a communication target radio unit which wirelessly communicates with an external communication device among two or more radio units having the communication function directly connected to the centralized unit via an optical fiber, and performs beamforming control of the communication target radio unit;

the communication target radio unit communicates with the external communication device in accordance with control of the centralized unit, wherein:

the centralized unit converts the downstream radio signal into the optical signal of a specific wavelength, and the communication target radio unit demultiplexes the optical signal into a plurality of optical signals and transmits a downstream radio signal obtained by converting the plurality of optical signals into a plurality of analog electric signals, to the external communication device via an antenna unit capable of switching a direction in which the downstream radio signal is transmitted according to a wavelength.

5. A wireless communication device comprising:

among a signal processing function and a communication function provided by a wireless communication device, a centralized unit having the signal processing function, and two or more radio units having the communication function directly connected with the centralized unit via optical fiber;

and wherein, the centralized unit transmits an optical signal having a form corresponding to the downstream radio signal to be transmitted by the communication function, to a communication target radio unit which wirelessly communicates with an external communication device, among two or more radio units having the communication function directly connected with the centralized unit via optical fiber, and performs beamforming control of the communication target radio unit;

and the communication target radio unit communicates with the external communication device according to the control of the centralized unit, wherein:

the centralized unit converts the downstream radio signal and the control signal into a plurality of optical signals and multiplexes the plurality of optical signals to generate the optical signals;

and the communication target radio unit demultiplexes the optical signal into a plurality of optical signals, and transmits the downstream radio signal obtained by conversion to the external communication device, on the basis of the control signal obtained by converting the plurality of optical signals into a plurality of analog electric signals.

* * * * *